(12) United States Patent
Matsunaga

(10) Patent No.: US 8,074,252 B2
(45) Date of Patent: Dec. 6, 2011

(54) COMMUNICATION SYSTEM, DATA PROCESSING DEVICE, DATA PROCESSING METHOD, DATA PROVIDING DEVICE, DATA PROVIDING METHOD, AND PROGRAM

(75) Inventor: Kiyobumi Matsunaga, Chiba (JP)

(73) Assignee: Sony Corporation, Tokyo (JP)

( * ) Notice: Subject to any disclaimer, the term of this patent is extended or adjusted under 35 U.S.C. 154(b) by 1242 days.

(21) Appl. No.: 10/522,621

(22) PCT Filed: Aug. 20, 2003

(86) PCT No.: PCT/JP03/10483
§ 371 (c)(1),
(2), (4) Date: Jan. 31, 2005

(87) PCT Pub. No.: WO2004/019210
PCT Pub. Date: Mar. 4, 2004

(65) Prior Publication Data
US 2005/0270423 A1    Dec. 8, 2005

(30) Foreign Application Priority Data
Aug. 21, 2002    (JP) .................................. 2002-240301

(51) Int. Cl.
*H04N 7/173*    (2011.01)
(52) U.S. Cl. .............................. 725/132; 725/37; 725/38
(58) Field of Classification Search .................... 725/37, 725/38, 132; 348/563
See application file for complete search history.

(56) References Cited

U.S. PATENT DOCUMENTS

| | | | |
|---|---|---|---|
| 5,721,829 A * | 2/1998 | Dunn et al. ..................... | 725/87 |
| 6,243,145 B1 * | 6/2001 | Schlarb et al. .................. | 725/39 |
| 6,728,698 B2 * | 4/2004 | Yen et al. ......................... | 707/2 |
| 6,760,917 B2 * | 7/2004 | De Vos et al. ................... | 725/94 |
| 7,099,561 B1 * | 8/2006 | Lin et al. ......................... | 386/95 |
| 2001/0014876 A1 * | 8/2001 | Miyashita ........................ | 705/37 |
| 2002/0049978 A1 * | 4/2002 | Rodriguez et al. .............. | 725/86 |
| 2003/0065794 A1 * | 4/2003 | Akazawa et al. ............. | 709/229 |
| 2007/0136748 A1 * | 6/2007 | Rodriguez et al. .............. | 725/37 |
| 2010/0186025 A1 * | 7/2010 | Thomas et al. ................... | 725/5 |

FOREIGN PATENT DOCUMENTS

| | | |
|---|---|---|
| JP | 2000-49998 | 2/2000 |
| JP | 2002-98534 | 4/2002 |
| JP | 2002-196933 | 7/2002 |
| JP | 2002-202876 | 7/2002 |
| JP | 2002-203168 | 7/2002 |

\* cited by examiner

*Primary Examiner* — Brian Pendleton
*Assistant Examiner* — Nnenna Ekpo
(74) *Attorney, Agent, or Firm* — Oblon, Spivak, McClelland, Maier & Neustadt, L.L.P.

(57) ABSTRACT

This invention relates to a communication system, a data processing apparatus, a data processing method, a data providing apparatus, a data providing method, and a program for offering services to users in response to their requests. Executable buttons representing executable functions are displayed in a given display format, while optional buttons representing optional functions are displayed in a different format. When a download button is operated to request download of software for implementing the function represented by any one of the executable buttons, the software in question is downloaded. Executing the downloaded software changes the optional button representing the implemented function into an executable button on display.

22 Claims, 19 Drawing Sheets

F I G. 6
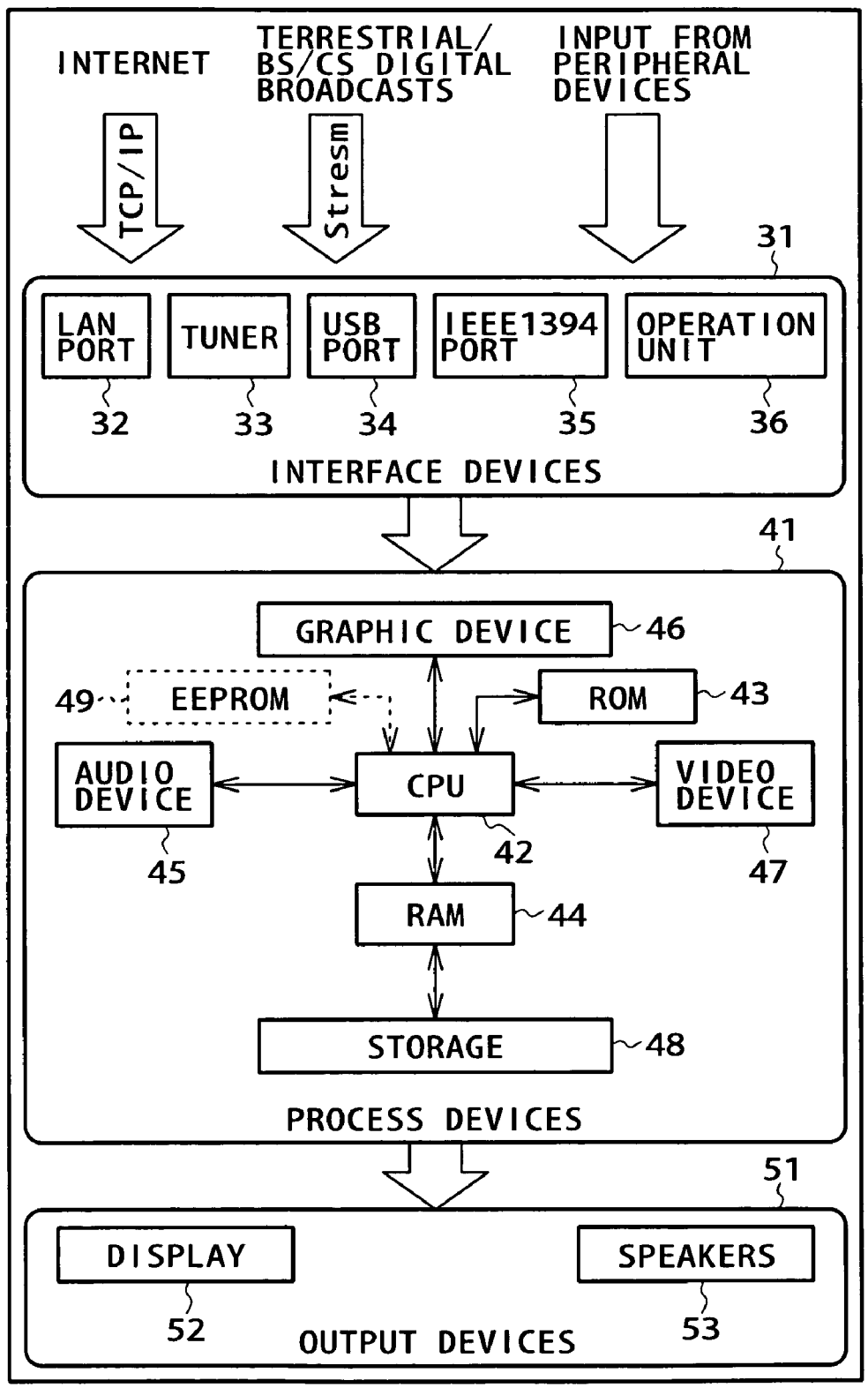

F I G. 7
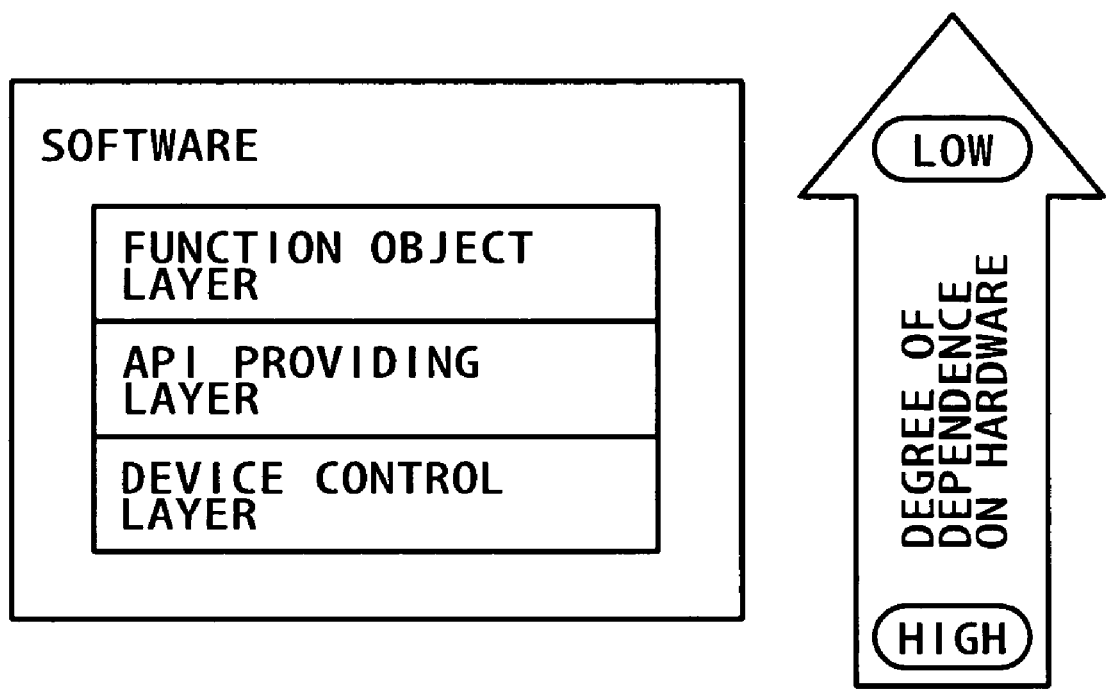

F I G. 9
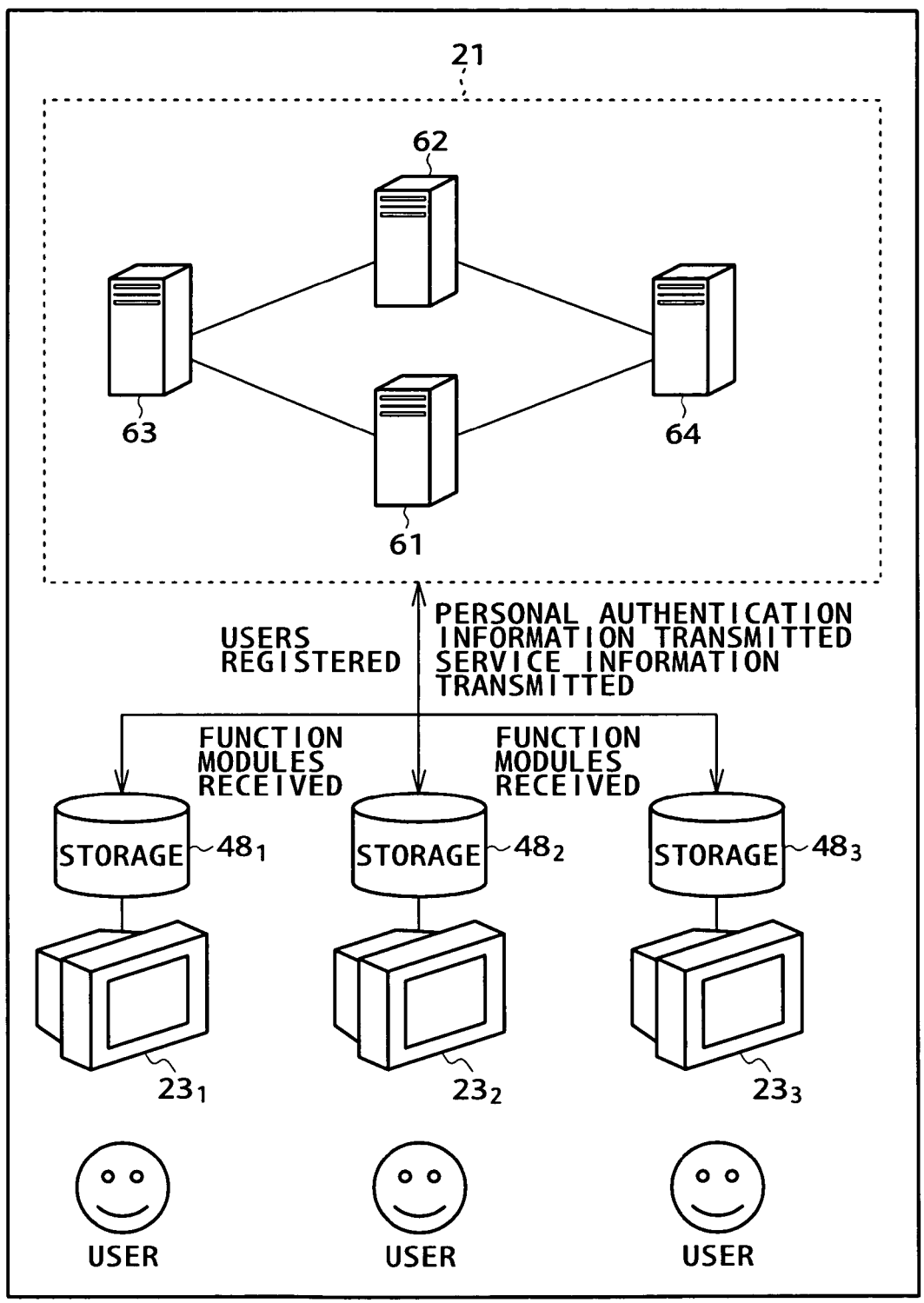

F I G. 2 0
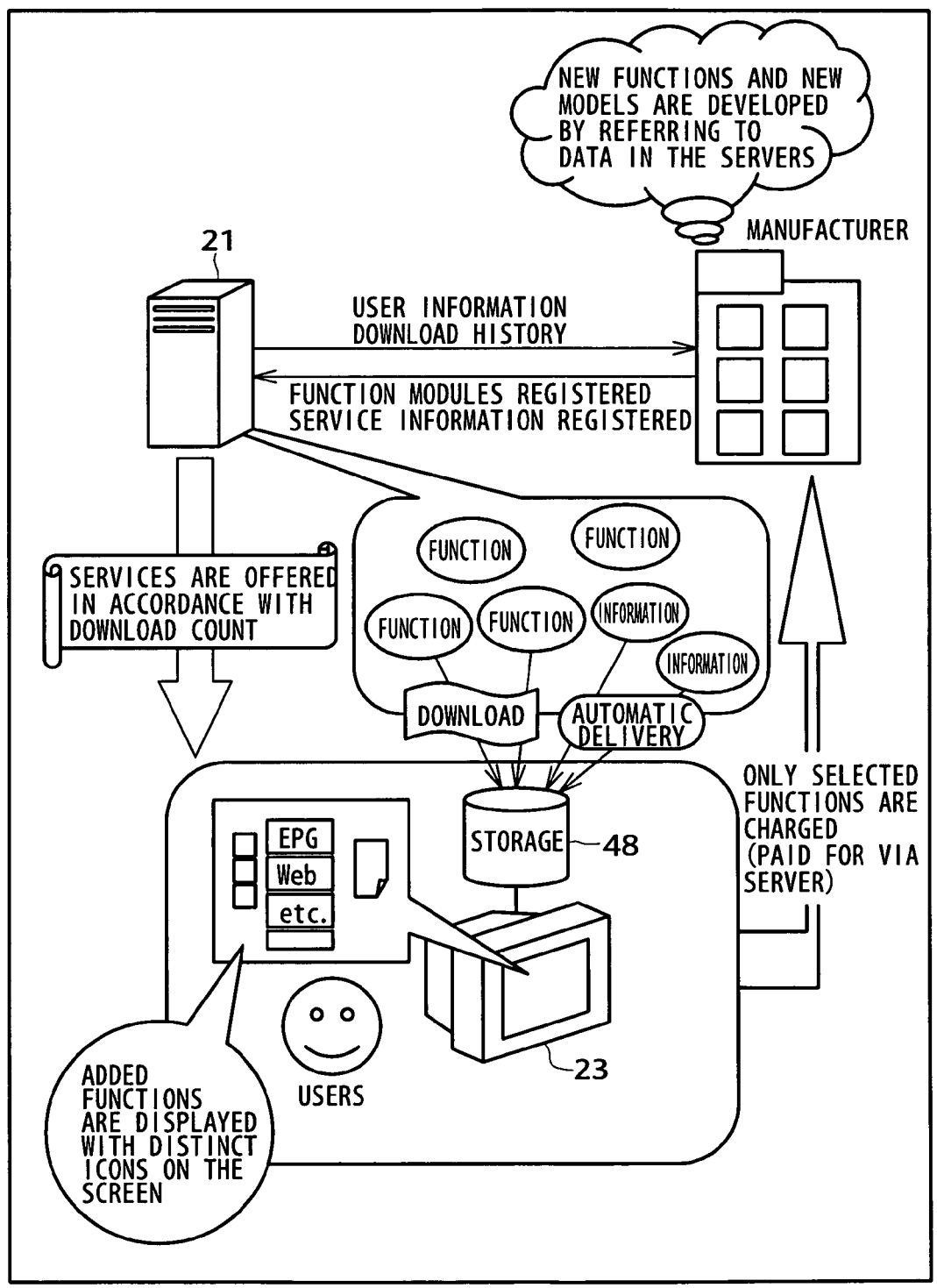

COMMUNICATION SYSTEM, DATA PROCESSING DEVICE, DATA PROCESSING METHOD, DATA PROVIDING DEVICE, DATA PROVIDING METHOD, AND PROGRAM

TECHNICAL FIELD

The present invention relates to a communication system, a data processing apparatus, a data processing method, a data providing apparatus, a data providing method, and a program. More particularly, the invention relates to a communication system, a data processing apparatus, a data processing method, a data providing apparatus, a data providing method, and a program for offering services to users in response to their requests.

BACKGROUND ART

Today, TV sets are among the most widespread terminals found in the households.

FIG. 1 shows a typical configuration of a conventional TV broadcasting system.

In FIG. 1, a ground-based analog broadcasting station 1 transmits terrestrial analog broadcast signals. A TV set 2 in each household receives the transmitted signals so as to display pictures based on the received signals and output the corresponding sounds.

FIG. 2 outlines a typical hardware structure of the TV set 2 in FIG. 1.

The TV set 2 is made up of a tuner block 11, various encoder blocks 12, and a receiver function microcomputer block 13. Under control of the receiver function microcomputer block 13, the tuner block 11 detects and demodulates the signal of a particular channel out of the terrestrial analog broadcast signals received. Also under control of the receiver function microcomputer block 13, the encoder blocks 12 subject the signal of a specific channel to, say, Y/C separation. The receiver function microcomputer block 13 thus controls the tuner block 11 and encoder blocks 12.

The TV set 2 in FIG. 2 is designed to comprise hardware and software components integrally. The TV set 2 has a single, integrated function: to receive terrestrial analog broadcast signals so as to display pictures based on the received signals while outputting the accompanying sounds. For that reason, it has been difficult to design a next-generation TV set that will inherit the structure of the conventional TV set 2 while allowing multiple function modules to be attached to or removed from the set individually as desired.

In recent years, there has been an appreciable increase in the variety of information-distributing media such as the Internet, BS (broadcasting satellite) digital broadcasts, CS (communication satellite) digital broadcasts, terrestrial digital broadcasts, and video games. The trend has highlighted the importance of the role played by the ubiquitous TV set in the household as a display device for receiving, processing, and displaying the diverse kinds of information transmitted by various media, as shown in FIG. 3.

All information used on the Internet; by BS, CS or terrestrial digital broadcasts; or in video games is digitized. To process such information requires loading appropriate software into hardware such as dedicated semiconductor devices for addressing digital information from different media (pictures, sounds and graphics), and a CPU (central processing unit) for controlling such hardware.

Software practiced today to offer functions for processing digital information includes browsers for displaying an EPG (electronic program guide) and BML/HTML (Broadcasting Markup Language/Hyper Text Markup Language) browsers capable of displaying web pages.

The functions implemented by such software are expected to grow progressively as more and more media are taken up to distribute digital information.

There is a high possibility of next-generation TV sets getting introduced in the near future, accompanied not only by functions for receiving information from numerous media but also by features based on a variety of application software for processing the received information.

The next-generation TV sets will be of multifunctional type as opposed to the single-function existing TV set 2. The growing functions of the new TV set are expected to prompt users to make function-related requests as follows:

(1) The user may want to customize the functionality of the TV set so that only the features considered necessary by the user will be in use;

(2) The user may want to pay only for the functions deemed necessary out of those offered by the TV set; and (3) The user may want to obtain detailed information about new functions that can be added to the TV set in the future.

The increasing functions may also lead TV set manufacturers to feel justified in getting the following requests satisfied:

(4) The manufacturer may want to know in a direct manner which of the many functions being offered have been accepted by users; and (5) The manufacturer may want to distribute the functions specifically desired by users to their TV sets, along with diverse kinds of information about such functions.

To respond to the requests (1) through (3) above requires attaching or detaching suitable software modules individually to or from the TV set in order to implement the desired functions. However, the selective installation of software modules into the user's TV set is difficult to accomplish if the TV set has inherited the design concept of the integrated hardware-software structure of the conventional TV set 2.

To satisfy the requests (4) and (5) above requires obtaining information as to which of the functions provided by the TV set are selected preferentially by users. Conventionally, as shown in FIG. 4, the manufacturers had their TV set users fill out a user registration form attached to each TV set purchased. The user registration forms soliciting the users' comments were mailed to and manually compiled by the manufacturers, so that the necessary information was picked up from the entries in the returned forms. It took an inordinately long time for the manufacturers to gather information about the users' preferred functions and offer the requested services in a timely manner.

DISCLOSURE OF INVENTION

The present invention has been made in view of the above circumstances and provides apparatuses and methods for providing services responding to users' preferences.

In carrying out the invention and according to one aspect thereof, there is provided a communication system comprising a data processing apparatus and a data providing apparatus; wherein the data processing apparatus includes: a button display controlling element for displaying first buttons representing executable functions in a first display format while displaying second buttons representing optional functions in a second display format; a downloading element which, in response to a download request for software implementing the function represented by any one of the second buttons, downloads the software provided by the data providing apparatus; and a display updating element for updating the display of the second button representing the function implemented by execution of the downloaded software, by displaying the second button in question in the first display format; and wherein the data providing apparatus includes: a software request receiving element for receiving the download request for the software from the data processing apparatus; and a software transmitting element for transmitting the software to the data processing apparatus in response to the download request for the software.

According to another aspect of the invention, there is provided a data processing apparatus comprising: a button display controlling element for displaying first buttons representing executable functions in a first display format while displaying second buttons representing optional functions in a second display format; a downloading element which, in response to a download request for software implementing the function represented by any one of the second buttons, downloads the software provided by a data providing apparatus; and a display updating element for updating the display of the second button representing the function implemented by execution of the downloaded software, by displaying the second button in question in the first display format.

According to a further aspect of the invention, there is provided a data processing method comprising the steps of: displaying first buttons representing executable functions in a first display format while displaying second buttons representing optional functions in a second display format; in response to a download request for software implementing the function represented by any one of the second buttons, downloading the software provided by a data providing apparatus; and updating the display of the second button representing the function implemented by execution of the downloaded software, by displaying the second button in question in the first display format.

According to an even further aspect of the invention, there is provided a first program comprising the steps of: displaying first buttons representing executable functions in a first display format while displaying second buttons representing optional functions in a second display format; in response to a download request for software implementing the function represented by any one of the second buttons, downloading the software provided by a data providing apparatus; and updating the display of the second button representing the function implemented by execution of the downloaded software, by displaying the second button in question in the first display format.

According to a still further aspect of the invention, there is provided a data providing apparatus comprising: a software request receiving element for receiving a download request for software from a data processing apparatus; a software transmitting element for transmitting the software to the data processing apparatus in response to the download request for the software; a download history creating element for creating a download history regarding the software downloaded by the data processing apparatus; and a processing element for performing a relevant process in keeping with the download history.

According to a yet further aspect of the invention, there is provided a data providing method comprising the steps of: receiving a download request for software from a data processing apparatus; transmitting the software to the data processing apparatus in response to the download request for the software; creating a download history regarding the software downloaded by the data processing apparatus; and performing a relevant process in keeping with the download history.

According to another aspect of the invention, there is provided a second program comprising the steps of: receiving a download request for software from a data processing apparatus; transmitting the software to the data processing apparatus in response to the download request for the software; creating a download history regarding the software downloaded by the data processing apparatus; and performing a relevant process in keeping with the download history.

Where the communication system of the invention made up of a data processing apparatus and a data providing apparatus is in use, the data processing apparatus displays first buttons representing executable functions in a first display format while displaying second buttons representing optional functions in a second display format. In response to a download request for software implementing the function represented by any one of the second buttons, the data processing apparatus downloads the software provided by the data providing apparatus, and updates the display of the second button representing the function implemented by execution of the downloaded software by displaying the second button in question in the first display format. The data providing apparatus receives the download request for the software from the data processing apparatus, and transmits the software to the data processing apparatus in response to the download request for the software.

Where the data processing apparatus, data processing method, and first program according to the invention are in use, first buttons representing executable functions are displayed in a first display format while second buttons representing optional functions are displayed in a second display format. In response to a download request for software implementing the function represented by any one of the second buttons, the software provided by a data providing apparatus is downloaded. The display of the second button representing the function implemented by execution of the downloaded software is then updated, the second button in question being shown in the first display format.

Where the data providing apparatus, data providing method, and second program according to the invention are in use, a download request for software is received from a data processing apparatus. In response to the download request, the software is transmitted to the data processing apparatus. A download history is then created regarding the software downloaded by the data processing apparatus, and a relevant process is performed in keeping with the download history.

BRIEF DESCRIPTION OF DRAWINGS

FIG. 6 is a block diagram presenting a typical hardware structure of a TV set 23;

FIG. 7 is a schematic view showing a layered architecture of software for use by the TV set 23;

FIG. 9 is a schematic view illustrating a typical configuration of a server system 21;

FIG. 20 is an explanatory view outlining a business model supported by the communication system embodying the invention.

BEST MODE FOR CARRYING OUT THE INVENTION

Figure 1:
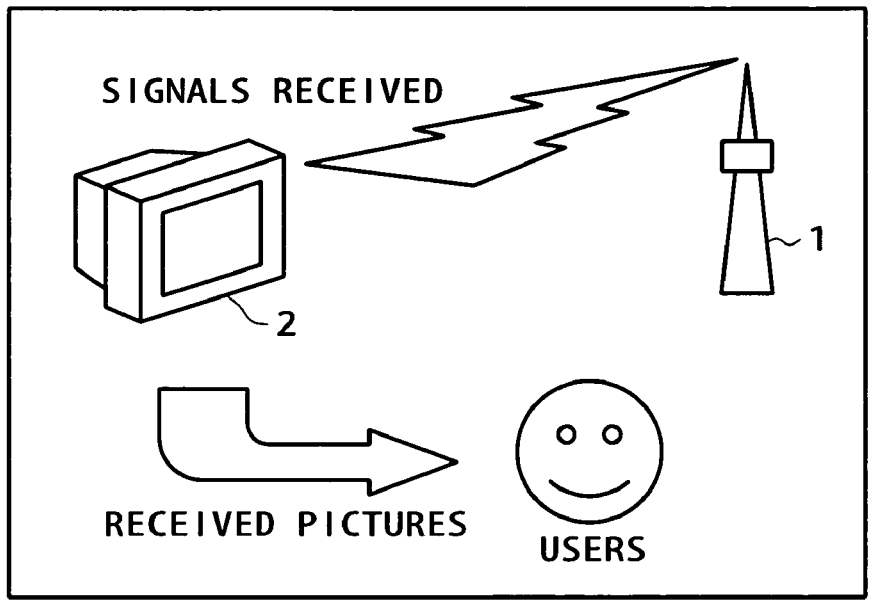
FIG. 1 is a schematic view showing a typical configuration of a conventional TV broadcasting system.
Figure 2:
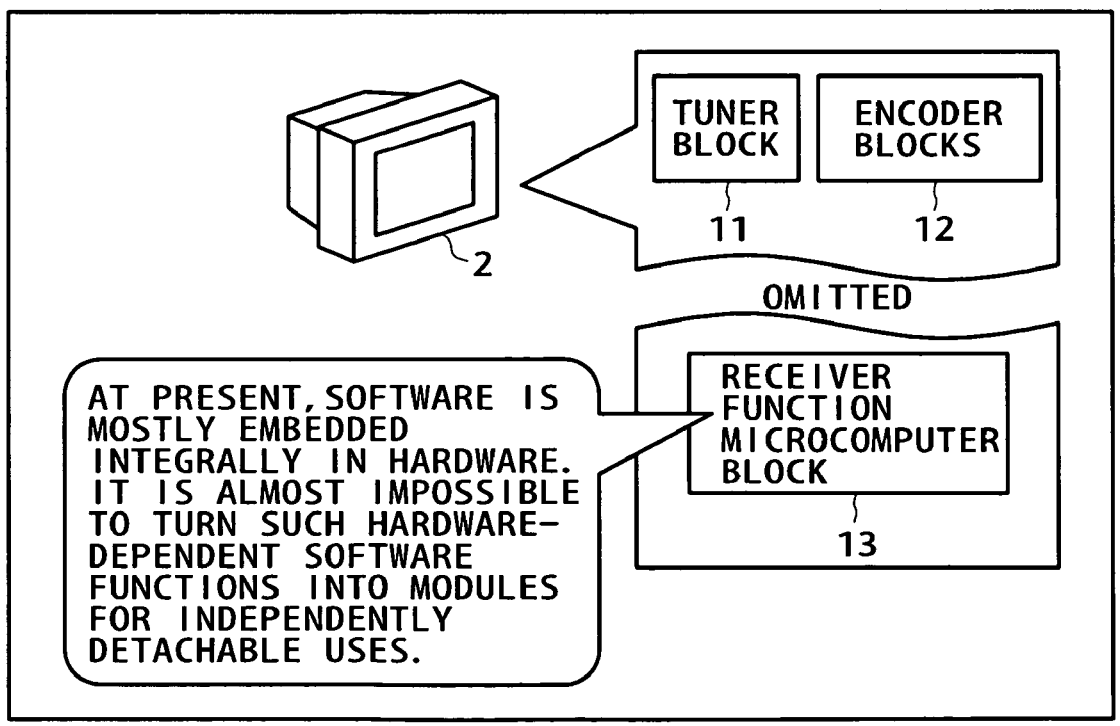
FIG. 2 is a block diagram indicating a typical structure of a TV set 1.
Figure 3:
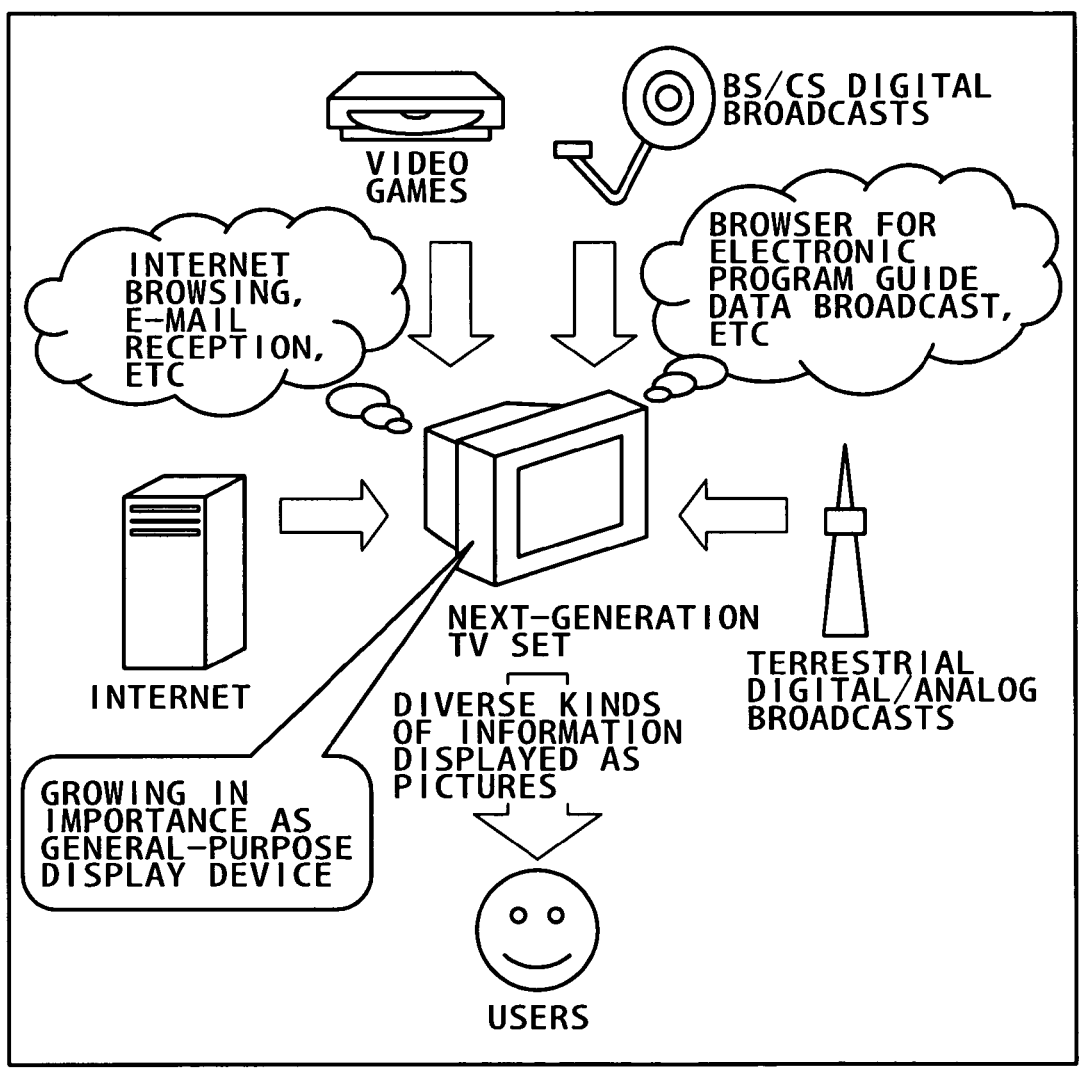
FIG. 3 is an explanatory view depicting typical roles to be played by a next-generation TV set.
Figure 4:
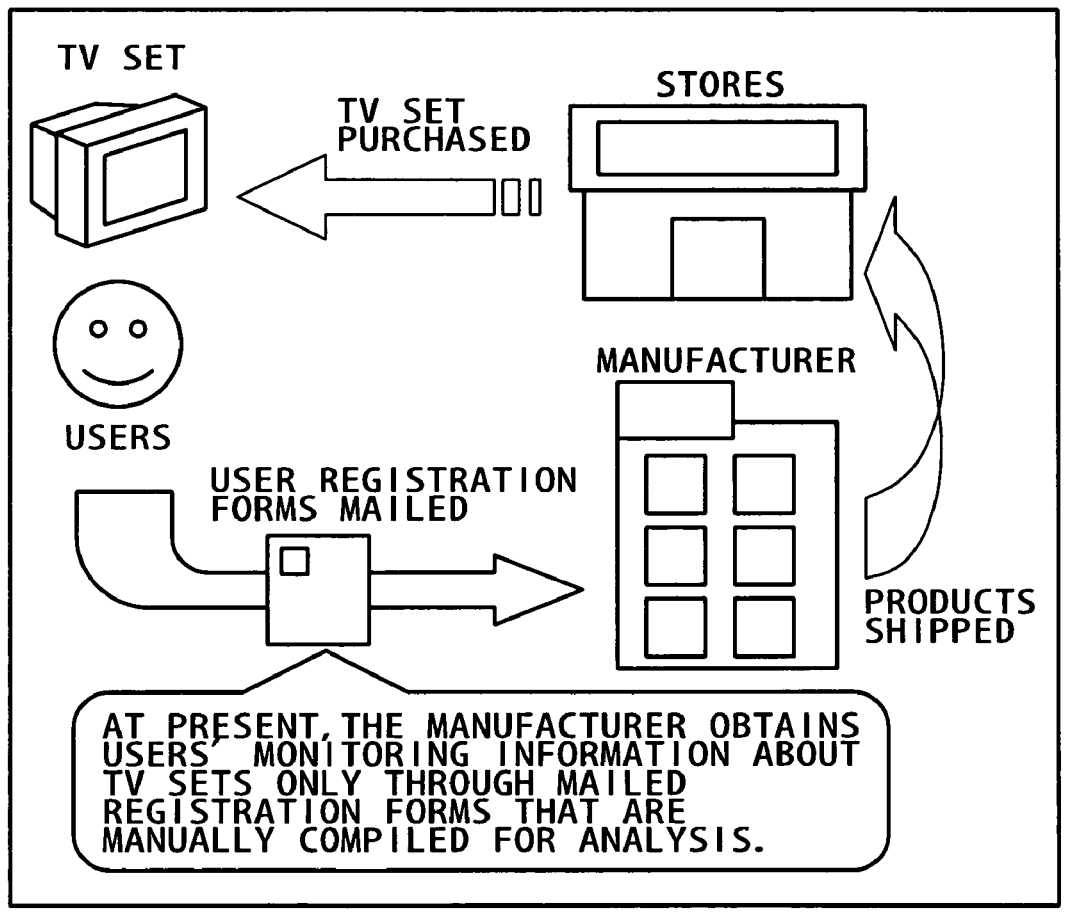
FIG. 4 is an explanatory view outlining how a manufacturer has conventionally recognized product functions preferred by users.
Figure 5:
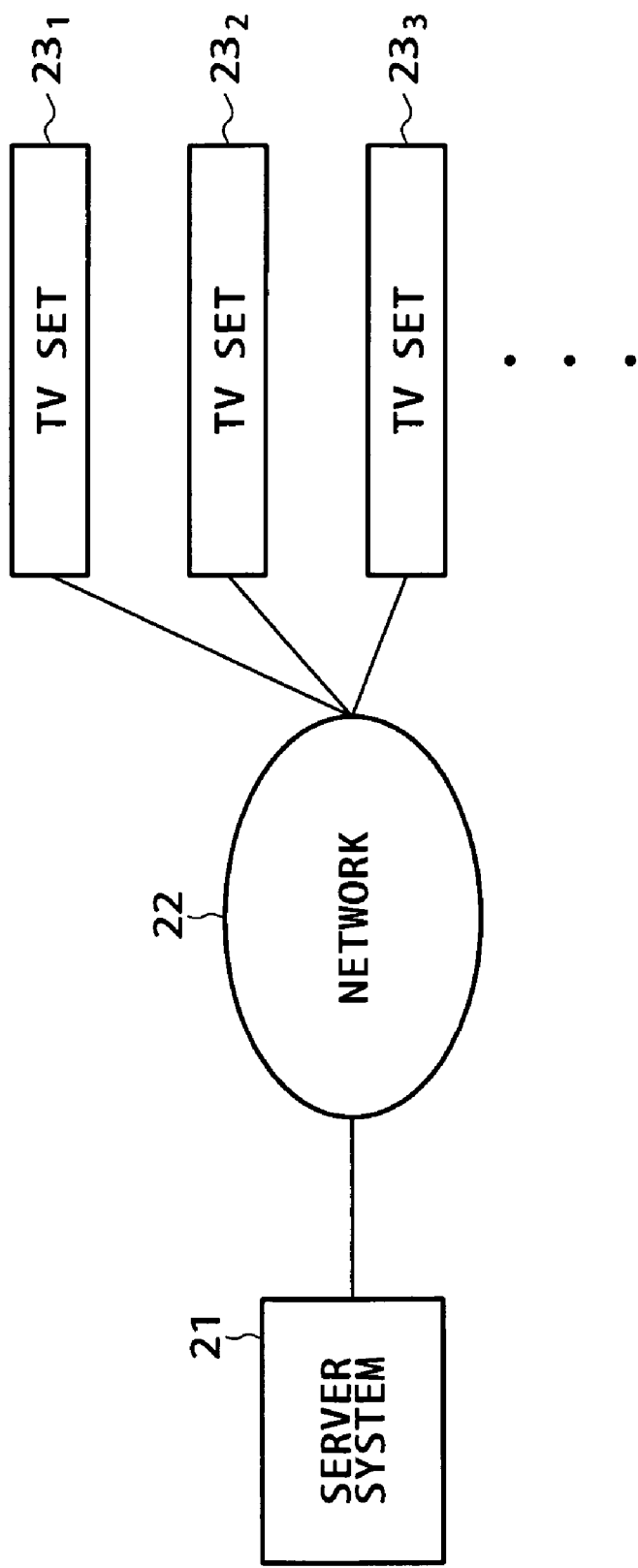
FIG. 5 is a block diagram sketching a typical configuration of a communication system embodying this invention.

FIG. 5 is a block diagram sketching a typical configuration of a communication system embodying this invention (the term "system" refers to a group of a plurality of logically configured devices which may or may not be included in a single enclosure).

In the embodiment of FIG. 5, the communication system is made up of the server system 21, a network 22, and one or more TV sets $23_1$, $23_2$, $23_3$, etc. Where there is no specific need to distinguish the TV sets $23_1$, $23_2$, $23_3$, etc., from one another, they will be referred to generically as the TV set 23 in the description that follows.

The server system 21 provides diverse services by communicating with the TV set 23 over the network 22. The network 22 is constituted by at least one of such communication media as the Internet, digital satellite broadcasting networks, digital communication satellite broadcasting networks, digital terrestrial broadcasting networks, analog terrestrial broadcasting networks, telephone lines, cable television (CATV) networks, and other suitable media in wired or wireless form. The TV set 23 receives various services while communicating with the server system 21 via the network 22.

FIG. 6 is a block diagram presenting a typical hardware structure of the TV set 23 in FIG. 5.

The TV set 23 is constituted by an interface device 31, a process device 41, and an output device 51. The interface device 31, process device 41 and output device 51 can be controlled by software. These devices are capable of communicating with one another using suitable arrangements.

The interface device 31 includes a LAN (local area network) port 32, a tuner 33, a USB (Universal Serial Bus) port 34, an IEEE (Institute of Electrical and Electronic Engineers) 1394 port 35, and an operation unit 36. With these components, the interface device 31 functions as an interface that deals with inputs from the outside (i.e., acts as an input interface).

More specifically, the LAN port 32 functions as an interface for communications under TCP/IP (Transmission Control Protocol/Internet Protocol) typified by the Internet. The tuner 33 is capable of receiving signals of diverse broadcasts such as digital satellite broadcasting networks, digital communication satellite broadcasting networks, digital terrestrial broadcasting networks, and analog terrestrial broadcasting networks. The tuner 33 detects, demodulates and decodes relevant signal elements out of the received signals. The USB port 34 provides communication controls based on USB standards, and the IEEE 1394 port 34 permits communication controls pursuant to IEEE 1394 standards. The operation unit 36 is operated by a user and outputs operation signals reflecting the operations.

Besides acting as input interfaces, the LAN port 32, USB port 35, and IEEE 1394 port 35 function as output interfaces for outputting signals to the outside.

In FIG. 6, the interface device 31 is shown having the operation unit 36 set up independently. Alternatively, the independent operation unit 36 may be replaced by suitable operating elements such as a mouse and a keyboard connected to the USB port 34.

The process device 41 is composed of a CPU 42, a ROM (read only memory) 43, a RAM (random access memory) 44, an audio device 45, a graphic device 46, a video device 47, and a storage 48. These devices combine to process external inputs to the interface device 31 and to control the interface device 31 and output device 51.

More specifically, the CPU 42 performs calculations and controls the configured devices (i.e., hardware) by executing programs stored in (or loaded into) the ROM 43 or RAM 44. Of modules (software modules) constituting the programs carried out by the CPU 42, those modules which are highly dependent on hardware are stored in the ROM 43. The modules in the ROM 43 are not erasable. Alternatively, the ROM 43 may be replaced by a EEPROM (electrically erasable programmable ROM) 49 as indicated by broken lines in FIG. 6, the EEPROM being arranged to store the modules that would otherwise be placed in the ROM 43. In this case, the modules in the EEPROM 49 may be updated or modified as needed.

The modules read from the storage 48 are loaded into the RAM 44. The RAM 44 also accommodates temporarily the data needed by the CPU 42 in carrying out its processes. It is assumed that the RAM 44 has a sufficient storage capacity to load the read storage 48 and to hold the data required by the CPU 42 in performing its operations.

The audio device 45 processes audio data that is input to the interface device 31. The graphic device 46 illustratively processes CG (computer graphics) data out of video data that is input to the interface device 31. The video device 47 processes natural image data out of the video data input to the interface device 31. In operation, the audio device 45, graphic device 46, and video device 47 illustratively perform data compression and decompression.

The storage 48 is typically made up of a hard disk drive or a flash memory. The storage 48 stores the data (including software) required to be retained when the TV set 23 is placed into switched-off state (or, where applicable, what is known as suspended or sleep state).

The output device 51 is typically composed of a display 52 and speakers 53. Information and data obtained from processing by the process device 32 are output by the output device 51 in ways perceptible by humans.

More specifically, the display 52 displays images derived from the processing by the process device 32. The speakers 53 output voices and sounds that are acquired from the processing by the process device 32.

Structured as described above, the TV set 23 is capable of downloading the modules (software) necessary for implementing desired functions from the server system 21 over the network 22. With the modules downloaded, their functions are offered to the user by the TV set 23.

The TV set 23 has its software structured in layers as shown in FIG. 7 in order to carry out tasks in layered fashion. More specifically, the TV set 23 has its software divided into a device control layer, an API (application program interface) providing layer, and a function object layer, reflecting different degrees of dependence on hardware.

The device control layer is the most dependent on hardware, followed by the API providing layer and function object layer, in that order.

The device control layer has a dedicated interface that exchanges information with the API providing layer situated immediately upward (which is less dependent on hardware) thereby controlling that upper layer. The API providing layer has its own dedicated interface that exchanges information with the function object layer located immediately upward thereby controlling that upper layer. With the device control layer and the API providing layer possessing their dedicated interfaces to communicate with their corresponding upper layers, the function object layer (i.e., software for offering diverse functions to the user) is made that much less dependent on hardware.

The device control layer, API providing layer, and function object layer will now be described in more detail with reference to FIG. 8.

The device control layer includes software for controlling hardware and furnishes the immediately upward API providing layer with an interface that controls the devices (i.e., device control interface) and an interface that announces inputs to the devices (i.e., diverse input information control interface). Since the software belonging to the device control layer is highly dependent on hardware, the modules constituting the software are placed in ROMs or the like of the chip devices to be controlled by execution of these modules. Illustratively, the software which belongs to the device control layer and which controls the process device 41 in FIG. 6 is stored in the ROM 43.

The software belonging to the device control layer typically includes an operating system (OS), firmware, and device drivers. It is preferred that the operating system be of multithread-ready type in order to implement a multitask-capable environment.

The API providing layer includes software acting as a dedicated API for use by the function objects which are the modules constituting the software belonging to the function object layer. The dedicated API is offered to the function object layer situated immediately upward. The objects (modules) making up the API belonging to the API providing layer are categorized illustratively by purpose and placed in the storage 48 in load module form. That means a new API may be added by writing to the storage 48 the objects constituting the new API.

The software (API) belonging to the API providing layer typically includes middleware and a graphic library. It should be noted that the API belonging to the API providing layer should illustratively be such that the corresponding device control layer uses the device control interface or the diverse input information control interface to be offered to the API providing layer.

When the TV set 23 is switched on, all API modules held in the storage 48 are read from there and loaded into the RAM 44. This renders all APIs ready to be utilized.

The function object layer includes objects (software) for independently implementing the functions to be offered to the user. The objects belonging to the function object layer are called function objects. The function objects are typically designed to act on independent threads under the operating system belonging to the device control layer.

A function object may be downloaded as an executable load module file from the server system 21 to the TV set 23 over the network 22 and stored into the storage 48. Given a start request from the user, the CPU 42 loads the corresponding function object into the RAM 44 for execution.

Figure 8:
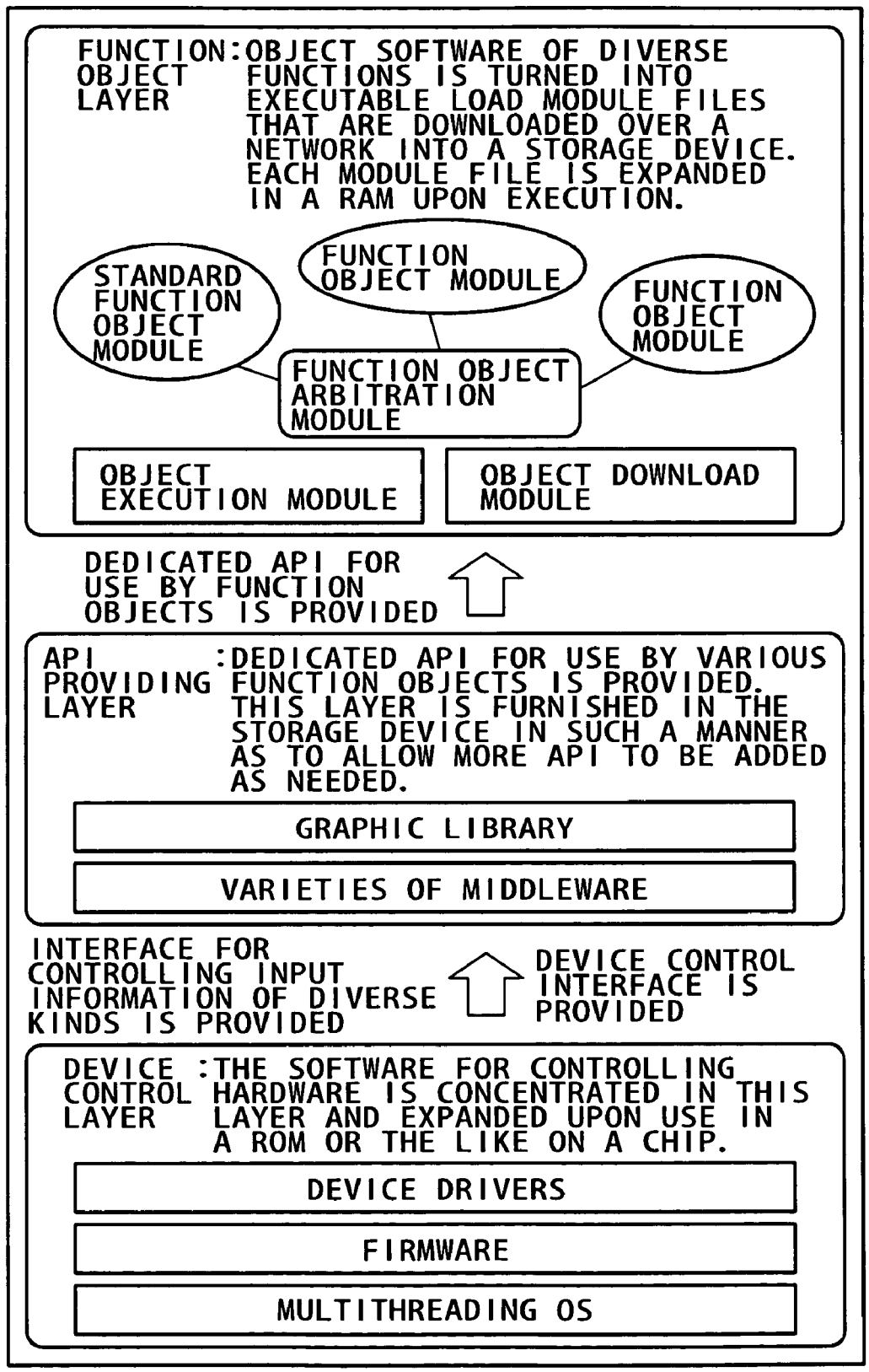
FIG. 8 is an explanatory view detailing a device control layer, an API providing layer, and a function object layer constituting the software architecture.

As shown in FIG. 8, the function object layer includes four modules (object modules) as standard: a function object download module, a function object arbitration module, a function object execution module, and a standard function object module. The four modules are stored in advance in the storage 48.

The function object download module downloads and receives function object module files from the server system 21 over the network 22. Besides receiving the function object modules, the function object download module transmits user information, model information, and a module list (to be discussed later) to the server system 21. When the TV set 23 is switched on, the function object download module is read from the storage 48 and loaded into the RAM 44 in a manner executable at any time by the CPU 42.

The function object arbitration module arbitrates resources (hardware) between a plurality of function objects when the latter remain concurrently active. When a new function object is downloaded to the TV set 23, the function object arbitration module registers the new object in the storage 48. The function object arbitration module is updated at the same time that any new function object is downloaded to the TV set 23. As with the function object download module, switching on the TV set 23 causes the function object arbitration module to be read from the storage 48 and loaded into the RAM in a manner executable at any time by the CPU 42.

The function object execution module starts and stops function objects. As with the function object download module, switching on the TV set 23 causes the function object execution module to be read from the storage 48 and loaded into the RAM in a manner executable at any time by the CPU 42.

The standard function object module is designed to implement minimum functions of the TV set (e.g., ability to tune in to received channels). As with the function object download module, switching on the TV set 23 causes the standard function object module to be read from the storage 48 and loaded into the RAM 44 in a manner executable at any time by the CPU 42. The standard function object module also controls illustratively a menu screen (to be discussed later) which serves as a GUI (graphical user interface) allowing the user to perform various operations.

The software to be incorporated in the TV set 23 is designed as described above. This software design makes it possible for the TV set 23 to download from the server system 21 the module of a new function object for implementing a new function, the function object arbitration module to be updated when the new function module is downloaded, and a new API that may be needed by the function object for implementing the new function, whereby the desired new function is added.

FIG. 9 is a schematic view illustrating a typical configuration of the server system 21. Although FIG. 9 shows three TV sets $23_1$, $23_2$ and $23_3$, the number of TV sets is not limitative of the invention. In FIG. 9, the storage 48 of a given TV set $23_i$ is presented as the storage $48_i$ using the suffix "i" to the corresponding TV set $23_i$.

In FIG. 9, the server system 21 is shown to be made up of four servers: a portal site server 61, a file delivery/storage server 62, an authentication/charging server 63, and a user information/download history management server 64. These servers are categorized by function or by purpose in order to provide diverse services such as the downloading of modules to the TV set 23 when requested by the latter. The server system 21 may alternatively be constituted by one, two, three, five or more servers.

The portal site server 61 is a "liaison" server that is initially accessed by the TV set 23. In turn, the portal site server 61 transmits function object modules, explanatory information about how to make downloads, and other information to the TV set 23 for use by the user. The portal site server 61 also transmits (i.e. transfers) any information from the TV set 23 to the file delivery/storage server 62, authentication/charging server 63, or user information/download history management server 64 as needed. Furthermore, the portable site server 61 receives user-oriented information from the file delivery/storage server 62, authentication/charging server 63, or user information/download history management server 64 and transmits the received information to the user's TV set 23.

The file delivery/storage server 62 stores various modules. If the TV set 23 requests downloading of any of these modules, the file delivery/storage server 62 provides the requested module or modules to the TV set 23 via the portal site server 61. In the file delivery/storage server 62, the administrator of the server system 21 may additionally categorize and store new modules that have been developed and fabricated by manufactures as well as various kinds of collected information destined for the user. Furthermore, the file delivery/storage server 62 functions as a storage for use by the portal site server 61, authentication/charging server 63, and user information/download history management server 64.

The authentication/charging server 63 charges the user for the modules that have been transmitted to the user's TV set 23. Furthermore, the authentication/charging server 63 specializes in sophisticated security-related processes such as user authentication and data decryption.

The user information/download history management server 64 manages user information and the number of accesses by the TV set 23 to the server system 21, counts the number of modules downloaded by each user's TV set 23 and the total number of downloads by all users, and generates a download history of such download counts for management purposes. Each module is provided with a category identifier for identifying the category (e.g., digital satellite broadcast category, Internet category, etc.) to which the module in question belongs. The user information/download history management server 64 recognizes the category of each downloaded module by its category identifier so as to count the number of downloads by category. The download history generated out of the category-wise download counts is used as basis for delivering user-oriented information, to be discussed later.

Figure 10:
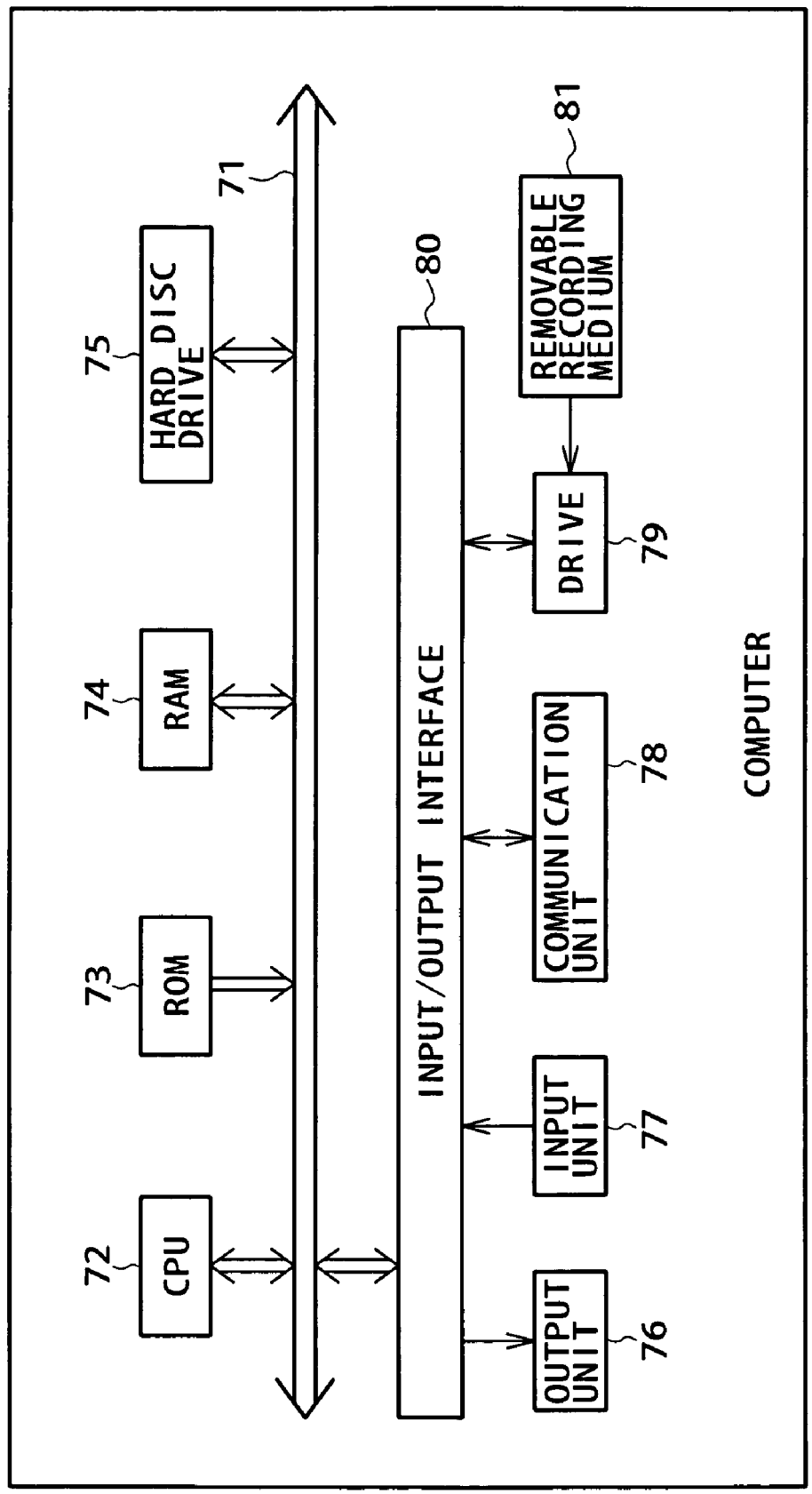
FIG. 10 is a block diagram showing a typical hardware structure of each of a portal site server 61, a file delivery/storage server 62, an authentication/charging server 63, and a user information/download history management server 64.

FIG. 10 is a block diagram showing a typical hardware structure of the portal site server 61 in FIG. 9.

The portal site server 61 carries out various processes by executing the programs installed inside.

More specifically, the programs to be performed by the portal site server 61 are stored beforehand on a hard disk drive 75 or in a ROM 73 provided as a recording medium in the server 61.

Alternatively, the programs may be stored temporarily or permanently on a removable recording medium 81 such as flexible disks, CD-ROM (compact disc read only memory), MO (magneto-optical) disks, DVD (digital versatile disk), magnetic disks, or a semiconductor memory. These types of removable storage medium 81 may be offered as so-called package software.

The programs may be installed from the above-described removable recording medium 81 into the portal site server 61. Alternatively, the programs may be transferred from a download site to the portal site server 61 wirelessly via a satellite for digital satellite broadcasts or in wired fashion over the network 22 such as a LAN (local area network) or the Internet. In the portal site server 61, the programs thus transferred are received by a communication unit 78 and installed onto the internal hard disk drive 75.

The portal site server 61 incorporates a CPU (central processing unit) 72 to which an input/output interface 80 is connected by way of a bus 71. The CPU 72 admits commands through the input/output interface 80 from an input unit 77 which, typically made up of a keyboard, a mouse and a microphone, is operated by the administrator of the server system 21, or from the communication unit 78 communicating with the outside. Given the commands, the CPU 72 carries out accordingly the programs held in the ROM (read only memory) 73. Alternatively, the CPU 72 may retrieve programs either from the removable recording medium 81 placed in a drive 79 or from the hard disk drive 75 on which the programs have been stored in advance or onto which the programs are installed after being transferred via satellite or over the network and received by the communication unit 78. The programs thus retrieved are loaded into a RAM (random access memory) 74 for execution. The CPU 72 then proceeds to carry out its processing in steps in a flowchart sequence, to be described later. The CPU 72 causes the result of the processing to be output from an output unit 76 including an LCD (liquid crystal display) and speakers via the input/output interface 80, to be transmitted from the communication unit 78, or to be recorded onto the hard disk drive 75.

Besides the portal site server 61, those servers making up the server system 21, i.e., file delivery/storage server 62, authentication/charging server 63, and user information/download history management server 64, have the same structure as the portal site server 61 shown in FIG. 10. It should be noted that the portal site server 61, file delivery/storage server 62, authentication/charging server 63, and user information/download history management server 64 have different programs installed respectively therein and carry out different processes accordingly.

In this description, the processing steps that describe the programs to be executed by the portal site server 61, file delivery/storage server 62, authentication/charging server 63, and user information/download history management server 64 represent not only the processes that are to be carried out in the subsequently depicted flowchart sequence (i.e., on a time series basis) but also processes that may be performed parallelly or individually (e.g., in parallel or object-oriented fashion). The same applies to the programs to be performed by the TV set 23.

How the TV set 23 of FIG. 6 functions in conjunction with the server system 21 will now be described with reference to the flowchart of FIG. 11.

Illustratively, the user first operates the operation unit 36 to get a menu screen displayed. This causes the CPU 41 to go to step S1. In step S1, the CPU 42 references the storage 48 to recognize currently executable functions as well as functions that are not executable at present but may be optionally added as needed.

More specifically, where the storage 48 is found to contain function objects that implement functions when carried out as programs, then the CPU 42 recognizes these functions as the currently executable functions. Where the storage 48 is not found to contain such function objects but have added function information about objects that may be added to the TV set 23, the CPU 42 recognizes as the optionally executable functions those functions that correspond to the added function information.

On recognizing the executable functions and the optional functions, the CPU 42 in step S1 generates a menu screen in GUI form showing the buttons representing the executable functions (called the executable buttons hereunder where appropriate) and the buttons denoting the optional functions (called the optional buttons hereunder where appropriate). The generated menu screen is displayed on the display 52.

Figure 12:
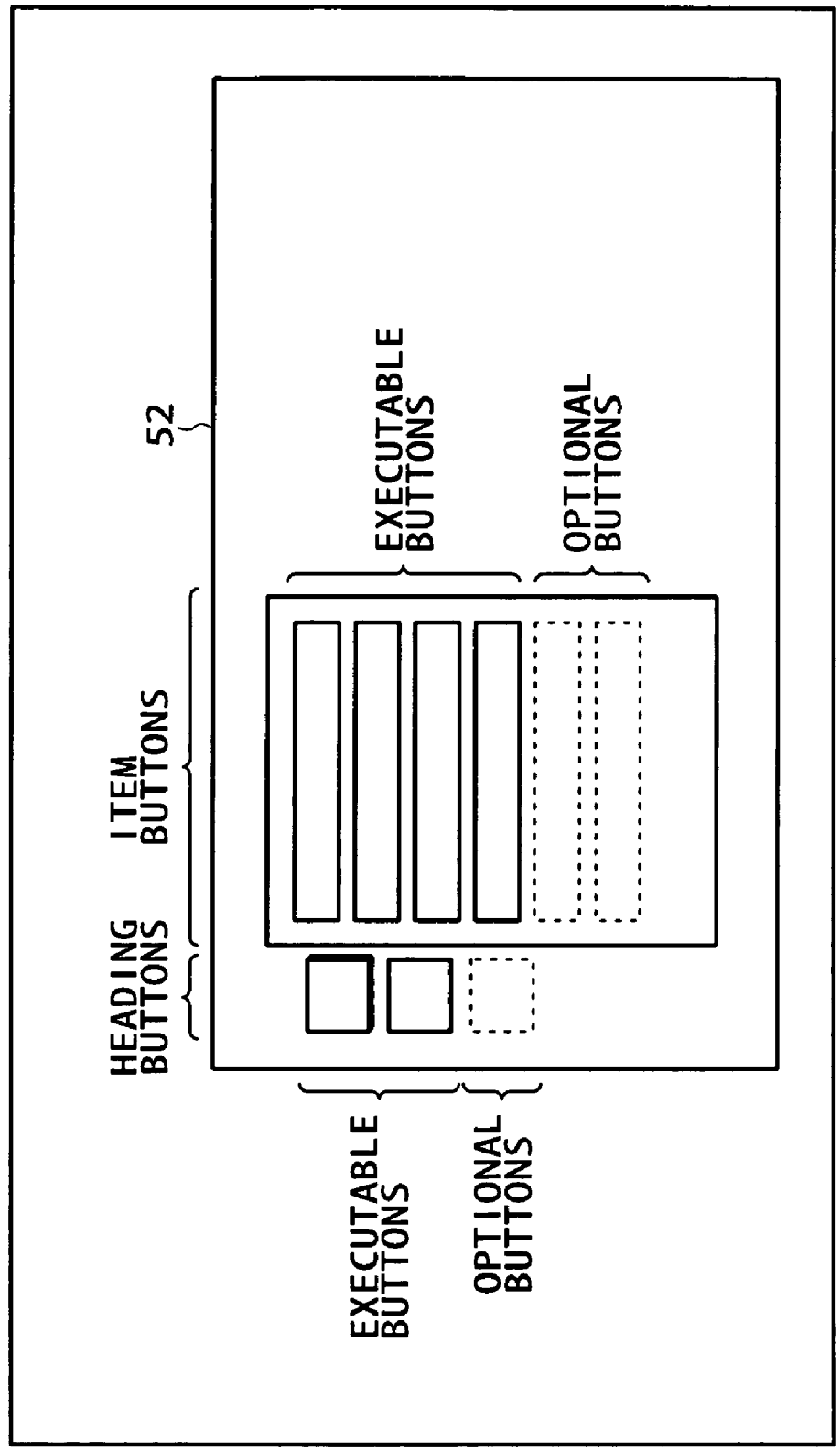
FIG. 12 is a schematic view depicting a typical display screen appearing on a display 52.

FIG. 12 shows a typical menu screen. The menu screen is made up of heading buttons and item buttons. A heading button is a button that represents all functions belonging to the same category. The user's act of "focusing" on a given heading button causes the item buttons indicating the functions belonging to the category represented by the heading button in question to appear on the right-hand side of the button being focused.

The expression "focusing" signifies that the user of the TV set 23 focuses his or her attention on something. More specifically, a cursor may be arranged to appear on the display 52 and be manipulated by the user operating the operation unit 36. When the user-manipulated cursor is positioned on a given button, that button is said to be focused.

In FIG. 12, (as in FIGS. 13 through 15 to be discussed later), the focused button is shown shaded. That means the topmost button out of the three heading buttons arranged in the leftmost position is shown focused in FIG. 12. To the right-hand side of the focused heading button appear the item buttons representing the functions belonging to the category identified by the focused button.

In FIG. 12, (as in FIGS. 13 through 15 to be discussed later), the buttons are schematically shown in rectangular form on the menu screen. Alternatively, the buttons on the menu screen may each carry a name evocative of the function represented by the button in question. As another alternative, the buttons on the menu screen may each be formed by an icon evocative of the function represented by the button in question.

Of the heading buttons and the item buttons on the menu screen in FIG. 12 (as well as in FIGS. 13 through 15 to be described later), the buttons indicated by solid lines denote executable buttons and those indicated by broken lines represent optional buttons. It means that of the three heading buttons on the left-hand side in FIG. 12, the upper two buttons are executable buttons and the bottom button is an optional button; of the six item buttons on the right-hand side in FIG. 12, the upper four buttons are executable buttons and the lower two are optional buttons.

On the menu screen, the executable buttons are displayed in one predetermined format and the optional buttons are indicated in another format different from that of the executable buttons. The varied manner of displaying the buttons of the different types allows the user easily to distinguish the executable buttons from the optional buttons.

For example, the executable buttons may be displayed in opaque form while the optional buttons may be indicated in semitransparent fashion on the menu screen.

Returning to FIG. 11, when the menus screen of FIG. 12 appears in step S1, step S2 is reached. In step S2, the CPU 42 determines whether any one of the buttons displayed on the menu screen is focused.

If in step S2 any of the buttons displayed on the menu screen is found to be focused, step S3 is reached. In step S3, the CPU 42 determines whether the focused button is a heading button or an item button. If in step S3 the focused button is found to be a heading button, then step S4 is reached. In step S4, the CPU 42 recognizes those item buttons which represent the functions belonging to the category corresponding to the heading button, updates the menu screen to reflect the recognized item buttons on the display 52, and returns to step S2.

If in step S3 the focused button is found to be an item button, step S5 is reached. In step S5, the CPU 42 determines whether the focused item button is an optional button.

If in step S5 the focused item button is not found to be an optional button, i.e., if the focused item button is found to be an executable button, then step S6 is reached. In step S6, the CPU 42 determines whether the selection of the focused executable button is finalized.

If in step S6 the selection of the focused executable button is not found to be finalized, step S2 is reached again. The subsequent steps are then repeated.

If in step S6 the selection of the focused executable button is found to be finalized, i.e., if the user is found to have performed an operation to finalize the selection of the focused executable button, then step S7 is reached. In step S7, the CPU 42 reads from the storage 48 a function object module for implementing the function represented by the executable button of which the selection has been finalized, and expands the module in the RAM 44. Step S7 is followed by step S8 in which the CPU 42 executes the function object expanded in the RAM 44. Step S2 is then reached again.

If in step S5 the focused item button is found to be an optional button, step S9 is reached. In step S9, the CPU 42 reads from the storage 48 an explanation of the function represented by the optional button (explanatory information) and displays the retrieved information on the display 52.

As described above, if the storage 48 contains added function information about the function represented by the optional button in question, that information is displayed on the menu screen. The added function information includes an explanation of the optionally added information. In step S9, the CPU 42 reads the function explanation out of the added function information in the storage 48 and displays the retrieved explanation on the display 52.

Figure 13:
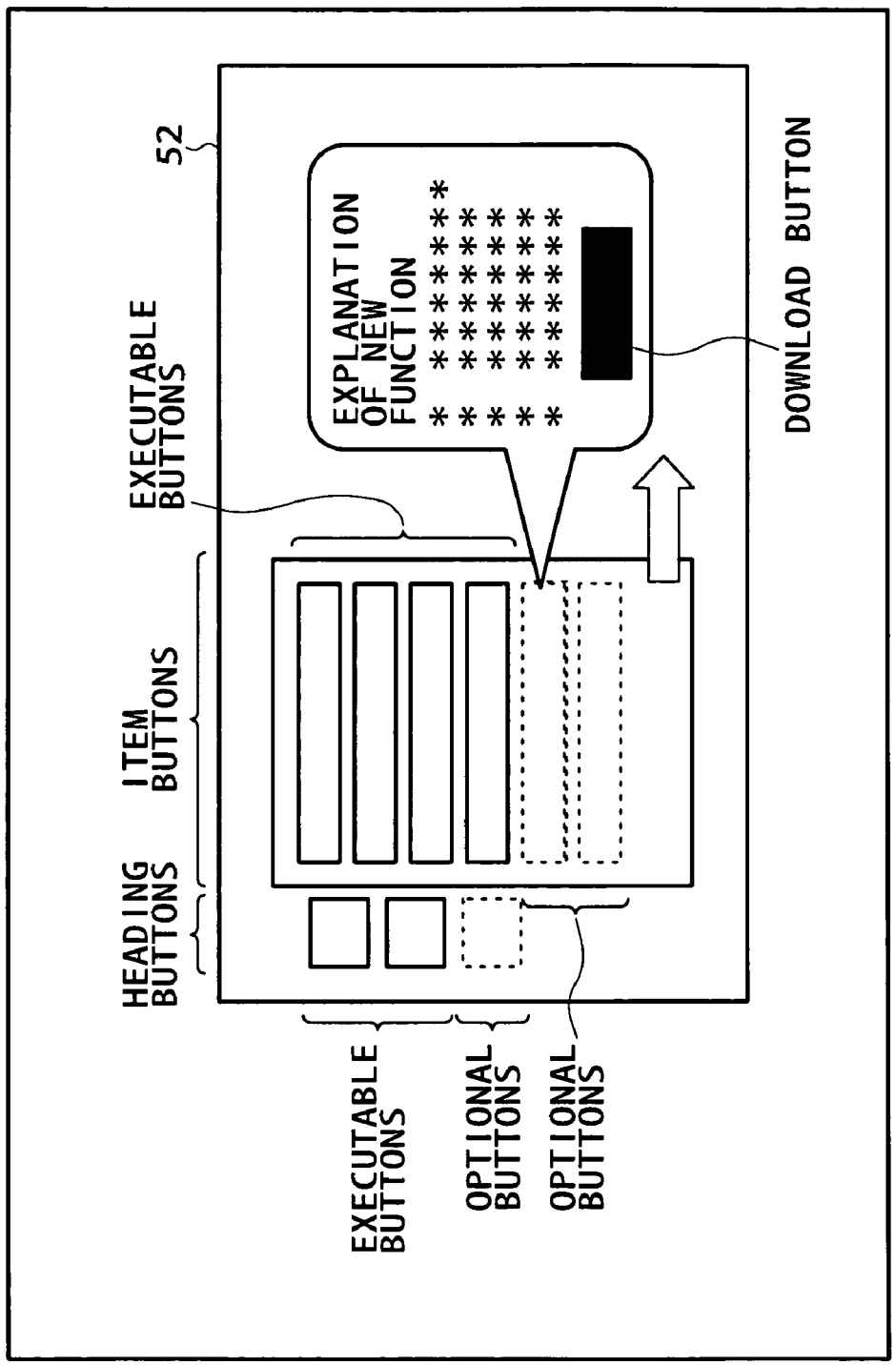
FIG. 13 is a schematic view indicating another typical display screen on the display 52.

FIG. 13 shows a display 52 indicating illustratively an explanation of a function. Of the six item buttons depicted in FIG. 13, the fifth button from the top, an optional button, is shown focused. An explanation is being given regarding the function represented by the optional button.

Where an explanation of the function represented by a given optional button is displayed as shown in FIG. 13, the display 52 also indicates a download button which may be operated to request download of the module for implementing the function represented by the optional button in question. In addition to a description of the function to be implemented by execution of the module, the function explanation indicates a fee for the module to be downloaded.

Returning to FIG. 11, the function explanation and the download button are displayed in step S9. Step S9 is followed by step S10. In step S10, the CPU 42 determines whether the download button displayed in step S9 is operated. If in step S10 the download button is not found to be operated, steps S11 and S12 are skipped and step S2 is reached again. The subsequent steps are then repeated.

If in step S10 the download button is found to be operated, i.e., if the user has operated the download button using the operation unit 36 in order to request download of the module needed to implement the function represented by the focused optional button, then step S11 is reached. In step S11, the CPU 42 downloads the requested module from the server system 21. The download process will be discussed later in more detail. Step S11 is followed by step S12.

In step S12, the CPU 42 generates a menu screen on which the optional button denoting the function implemented by execution of the downloaded module is changed into an executable button. The generated menu screen replaces what is currently shown on the display 52, and step S2 is reached again.

The module downloaded in the download process of step S11 is stored into the storage 48, as will be discussed later.

In step S12, as in step S1, the CPU 42 recognizes the currently executable functions and optional functions by referring to the storage 48, and generates a menu screen based on the results of the recognition. After the download process of step S11, the storage 48 holds the module for implementing the function represented by the optional function button selected earlier. The function represented by the optional button before the download process is recognized as an executable process by the CPU 42 after the download process. The optional button focused before the download process is thus changed into an executable button.

Figure 14:
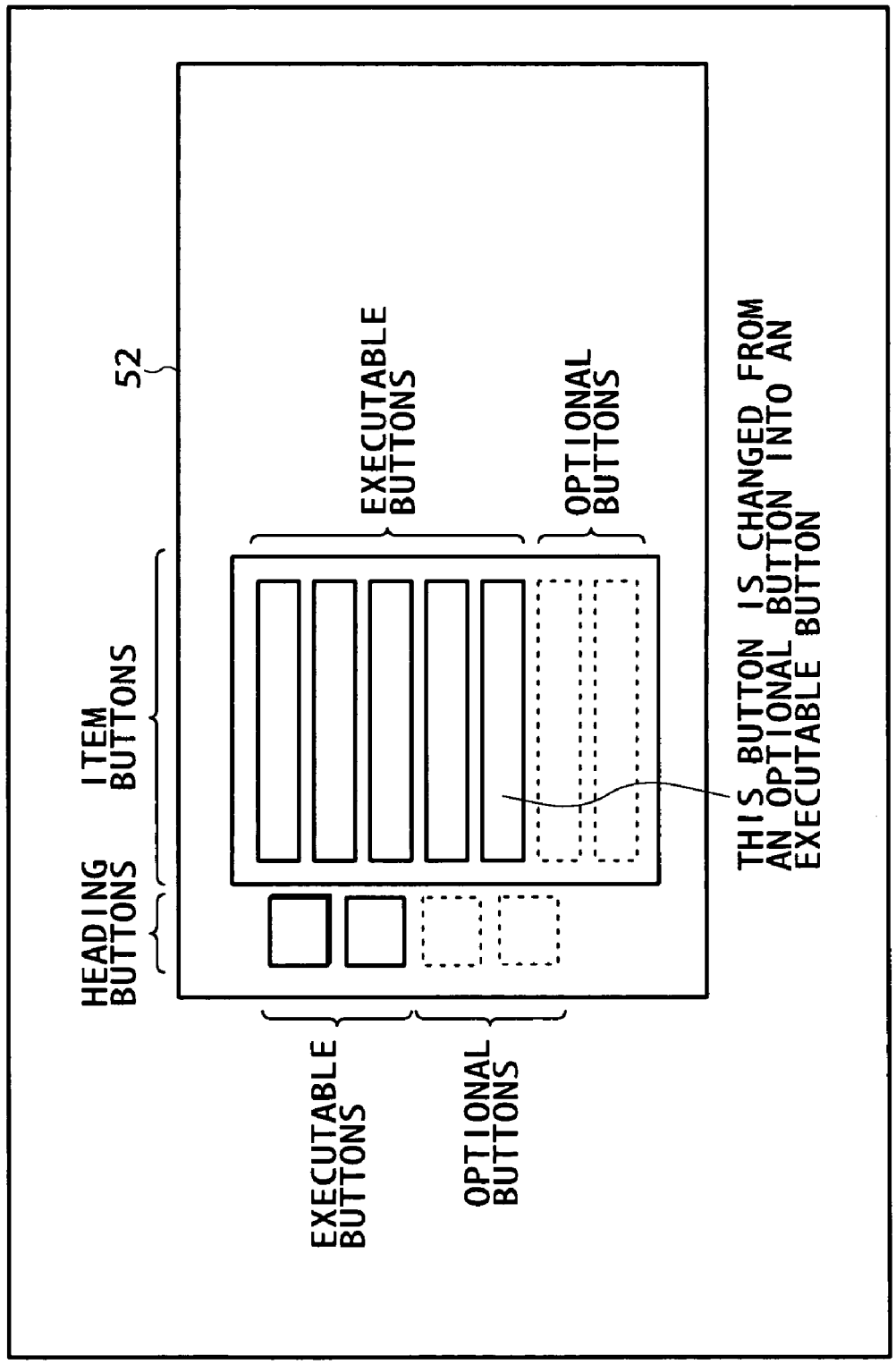
FIG. 14 is a schematic view presenting another typical display screen on the display 52.

FIG. 14 shows a menu screen on which an optional button is changed into an executable button.

Suppose that, of the six item buttons such as those shown in FIG. 13, the fifth button from the top, an optional button, is focused and that the download button is operated. In that case, the module needed to implement the function represented by the optional button is downloaded. After the download, the fifth item button from the top is changed from an optional button (in FIG. 13) to an executable button (in FIG. 14) on display.

As opposed to FIG. 13, the menu screen of FIG. 14 is characterized in that the fifth item button from the top is changed from an optional button to an executable button on display, and that a fourth heading button from the top (at bottom) and a seventh item button from the top (at bottom) are added.

Illustratively, if the manufacturer develops and produces a modules that implements a new function, that module is registered in the server system 21 together with added function information about the function realized by the module. In response to a download request from a TV set 23, the server system 21 transmits the requested module to the TV set 23 along with the relevant added function information. For its part, the TV set 23 stores into the storage 48 the requested module and added function information sent from the server system 21 in the download process of step S11 in FIG. 11.

After the added function information about the newly added function is placed into the storage 48 in the download process of step S11, step S12 is reached. In step S12, the CPU 42 references the storage 48 so as to recognize as an optional function the function corresponding to the added function information newly stored into the storage 48.

On the menu screen of FIG. 14, the fourth heading button from the top (at bottom) and the seventh item button from the top (at bottom) are shown representing the optional function corresponding to the added function information placed in the storage 48.

Figure 11:
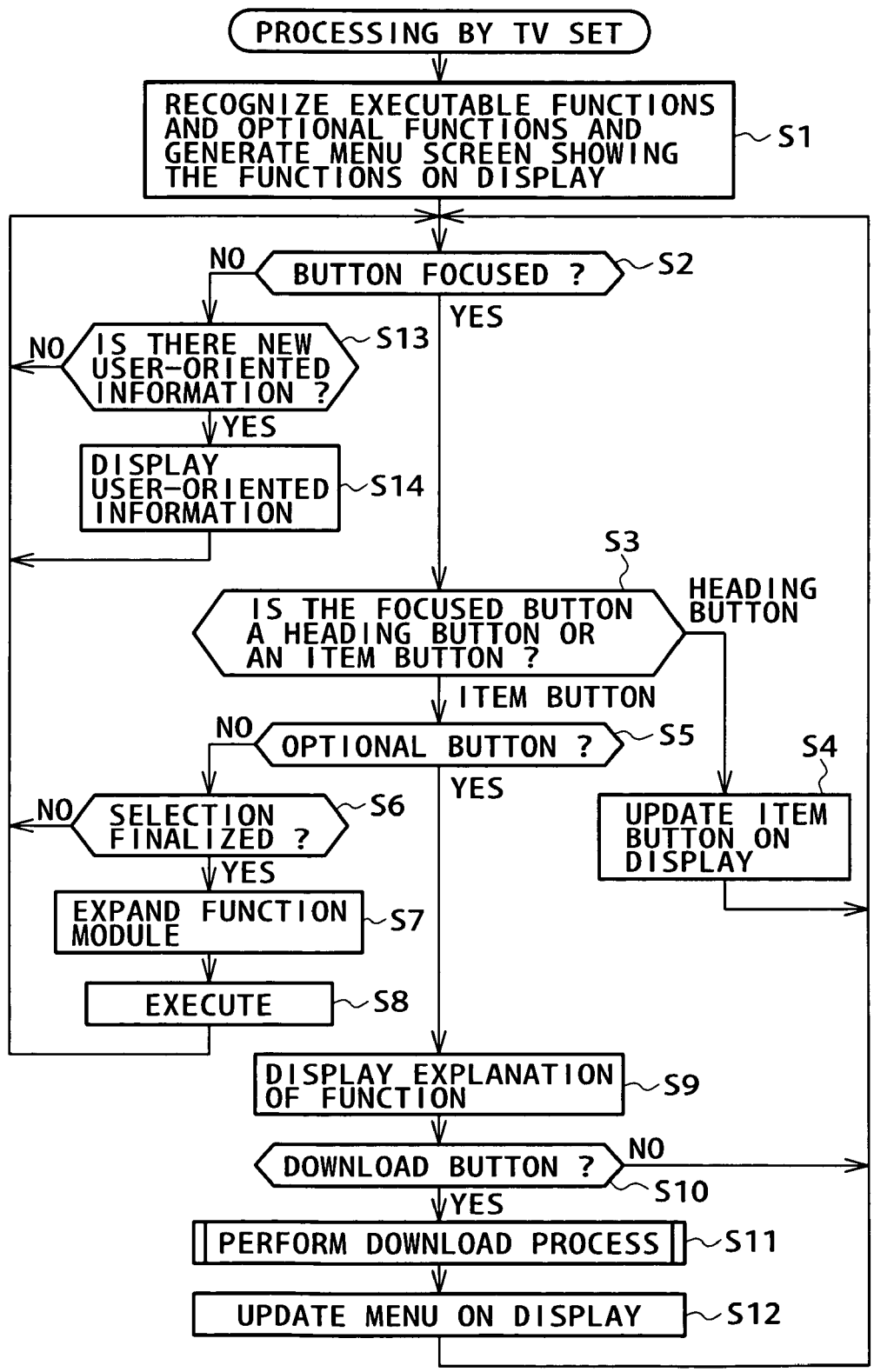
FIG. 11 is a flowchart of steps constituting a process performed by the TV set 23.

If in step S2 of FIG. 11 none of the buttons on the menu screen is found to be focused, then step S13 is reached. In step S13, the CPU 42 checks to see whether the storage 48 contains any new user-oriented information yet to be displayed.

The server system 21 accommodates registration of not only the modules for implementing diverse functions in the TV set 23 along with the added function information about these modules but also various kinds of user-oriented information that the manufacturer may wish to offer to the TV set user. When new user-oriented information is registered with the server system 21, the server system 21 transmits that information additionally to any TV set 23 that may request download of a module. When the user-oriented information is sent from the server system 21 to the TV set 23 along with the requested module in the download process of step S11 in FIG. 11, the TV set 23 places the downloaded module as well as the user-oriented information into the storage 48. What takes place in step S13 is thus a check on whether there still exists in the storage 48 any new user-oriented information that is yet to be displayed.

If in step S13 new user-oriented information to be displayed is not found to exist in the storage 48, step S14 is skipped and step S2 is reached again. The subsequent steps are then repeated.

If in step S13 the storage 48 is found to contain any new user-oriented information yet to be displayed, step S14 is reached. In step S14, the CPU 42 reads the new user-oriented information from the storage 48 and gets the retrieved information displayed on the display 52. Step S2 is then reached again.

Figure 15:
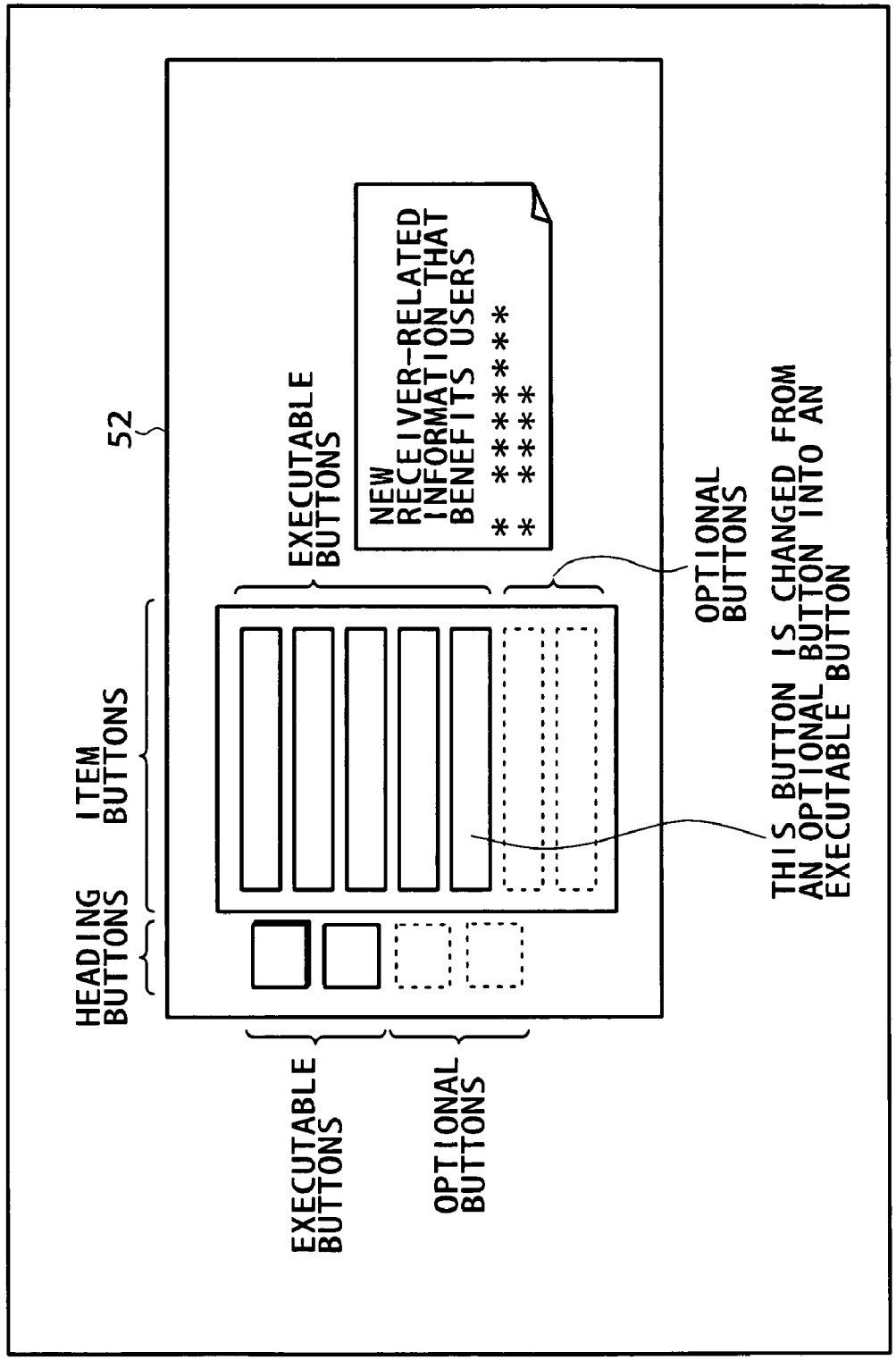
FIG. 15 is a schematic view giving another display typical screen on the display 52.

FIG. 15 shows a display 52 having user-oriented information additionally displayed on the menu screen of FIG. 14.

The process in FIG. 11 performed by the TV set 23 is terminated illustratively when the user operates the operation unit 36 to end the display of the menu screen.

Figure 16:
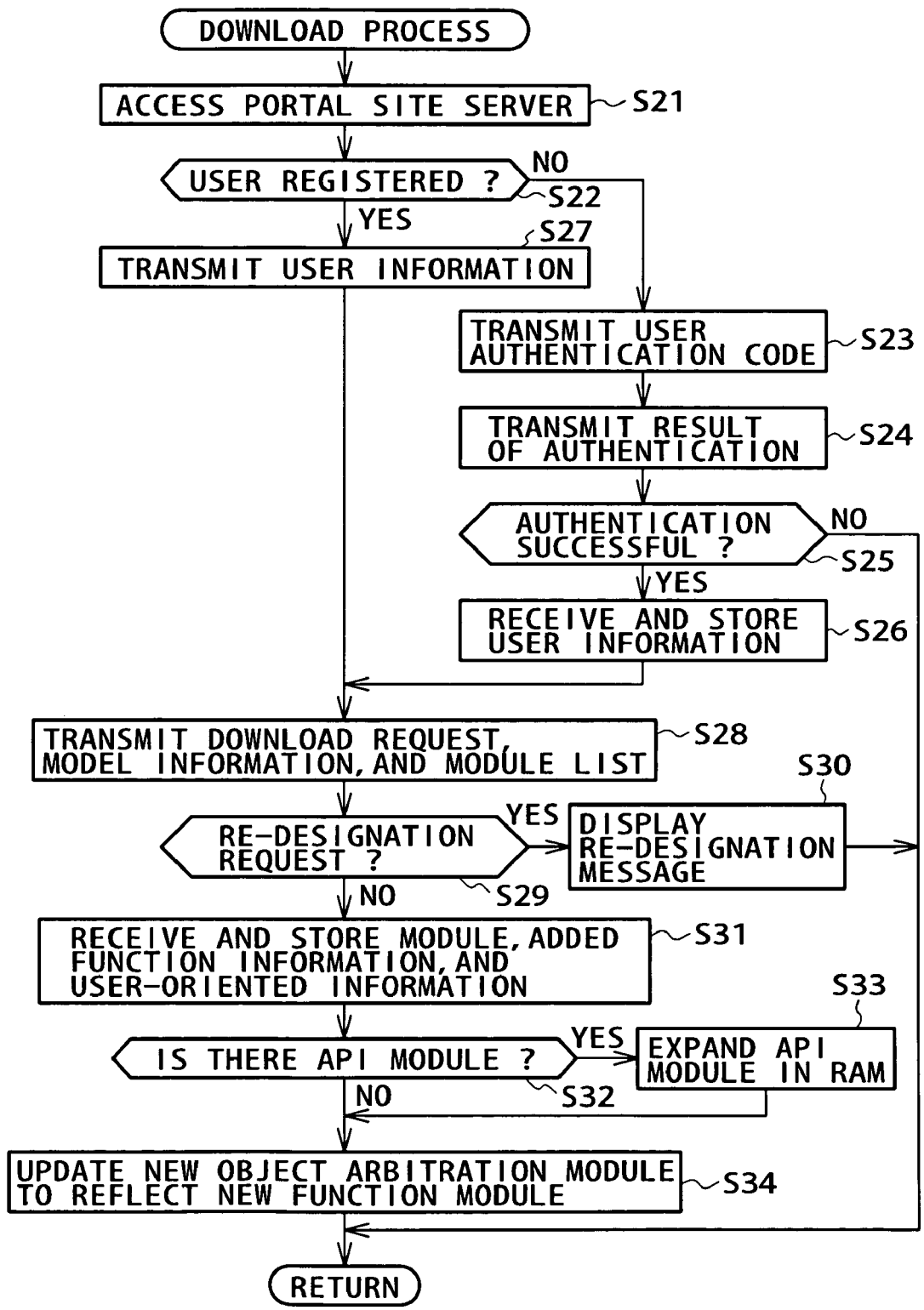
FIG. 16 is a flowchart of steps detailing a download process.

Described below with reference to FIG. 16 is the download process carried out in step S11 of FIG. 11.

In step S21, the CPU 42 accesses the portal site server 61 of the server system 21 in FIG. 9 via the network 22 so as to establish a communicable state with the server 61.

In step S22, the CPU 42 determines whether user registration has been completed as a precondition for receiving services from the server system 21.

When the user has registered his or her TV set 23 with the server system 21, the server 21 issues user information including a user ID and a password to the registered user. The user information issued by the server system 21 is transmitted to the TV set 23 and placed into the storage 48, as will be discussed later. What takes place in step S22 is thus the check to see if such user information exists in the storage 48 as evidence of the user registration.

If in step S22 the user is not found to have registered yet, step S23 is reached. In step S23, the CPU 42 transmits a user authentication code to the server system 21. Illustratively, the storage 48 of each legitimate TV set 23 (i.e., a product authorized to receive services from the server system 21) contains a user authentication code identifying the TV set 23 in question. That user authentication code is transmitted to the server system 21 in step S23.

Alternatively, the user authentication code may be written on a sheet of paper that may be included in the package containing each TV set. In that case, the user may operate the operation unit 36 to input the code.

When the user authentication code is transmitted to the server system 21 in step S23, the server system 21 carries out an authentication process using the transmitted code. The result of the authentication process is sent from the server system 21 to the TV set 23.

The CPU 42 waits for an outcome of the authentication process to arrive from the server system 21 in step S24. Upon receipt of the result of the authentication, the CPU 42 goes to step S25.

In step S25, the CPU 42 determines whether the authentication by the server system 21 is successful based on the result of the authentication received in step s24. If in step S25 the authentication is not found to be successful (i.e., if the server system 21 fails to authenticate the user), then the subsequent steps are aborted and control is returned.

If in step S25 the authentication is found to be successful, step S26 is reached. In step S26, the CPU 42 receives user information from the server system 21 and places the received information into the storage 48. Then the CPU 42 goes to step S28.

If in step S22 the user is found to have registered already, i.e., if the user information is found to exist in the storage 48, then step S27 is reached. In step S27, the CPU 42 transmits the stored user information from the storage 48 to the server system 21. Step S27 is followed by step S28.

The user information transmitted in step S27 may be input alternatively by the user operating the operation unit 36.

In step S28, the CPU 42 transmits a download request, model information, and a module list to the server system 21.

The download request is a message transmitted to request the download of the module necessary for implementing the function represented by the optional button that is being focused when the download button is found operated in step S10 of FIG. 11. As such, the download request includes information for specifying the function of interest (function specifying information). The model information denotes the version of the TV set 23. The module list is a list of the modules installed in the TV set 23, of their versions, and of other information.

After sending the download request, model information, and module list to the server system 21 in step S28, the CPU 42 reaches step S29. In step S29, the CPU 42 determines whether a re-designation request is transmitted from the server system 21.

More specifically, the server system 21 determines whether the module for implementing the function requested by the download request can be executed by the TV set 23 whose version is indicated by the model information. If the TV set 23 with its reported version is deemed incapable of carrying out the requested module, the server system 21 transmits to the TV set 23 a re-designation request asking the TV set user to re-designate another module for implementing another function. A check is made in step S28 to see whether such a re-designation request is sent from the server system 21.

If in step S29 the re-designation request is found to be transmitted from the server system, 21, step S30 is reached. In step S30, the CPU 42 causes the display 52 to display the re-designation message prompting the user to re-designate a different module for implementing a different function. Control is then returned.

If in step S29 no re-designation request is found to have been sent, step S31 is reached. In step S31, the CPU 42 receives the module downloaded from the server system 21 as requested by the download request, and places the downloaded module into the storage 48.

The server system 21 might transmit to the TV set 23 the above-mentioned added function information or user-oriented information in addition to the module requested for download. If that happens, the added function information or user-oriented information is received in step S31 together with the module. All that has been received is placed into the storage 48.

Step S31 is followed by step S32. In step S32, the CPU 42 determines whether there exists any API module (i.e., a module that belongs to the API control layer shown in FIG. 8) among the modules newly placed into the storage 48 in step S31. If in step S32 any API module is found to exist among the newly stored modules in the storage 48, step S33 is reached. In step S33, the CPU 42 reads the API module from the storage 48 and expands the retrieved module in the RAM 44 for use. Step S33 is followed by step S34.

If in step S32 no API module is found to exist among the newly stored modules in the storage 48, step S33 is skipped and step S34 is reached. In step S34, the CPU 42 updates the function object module in the storage 48 to reflect the function object modules stored anew into the storage 48 in step S31. Control is then returned.

Figure 17:
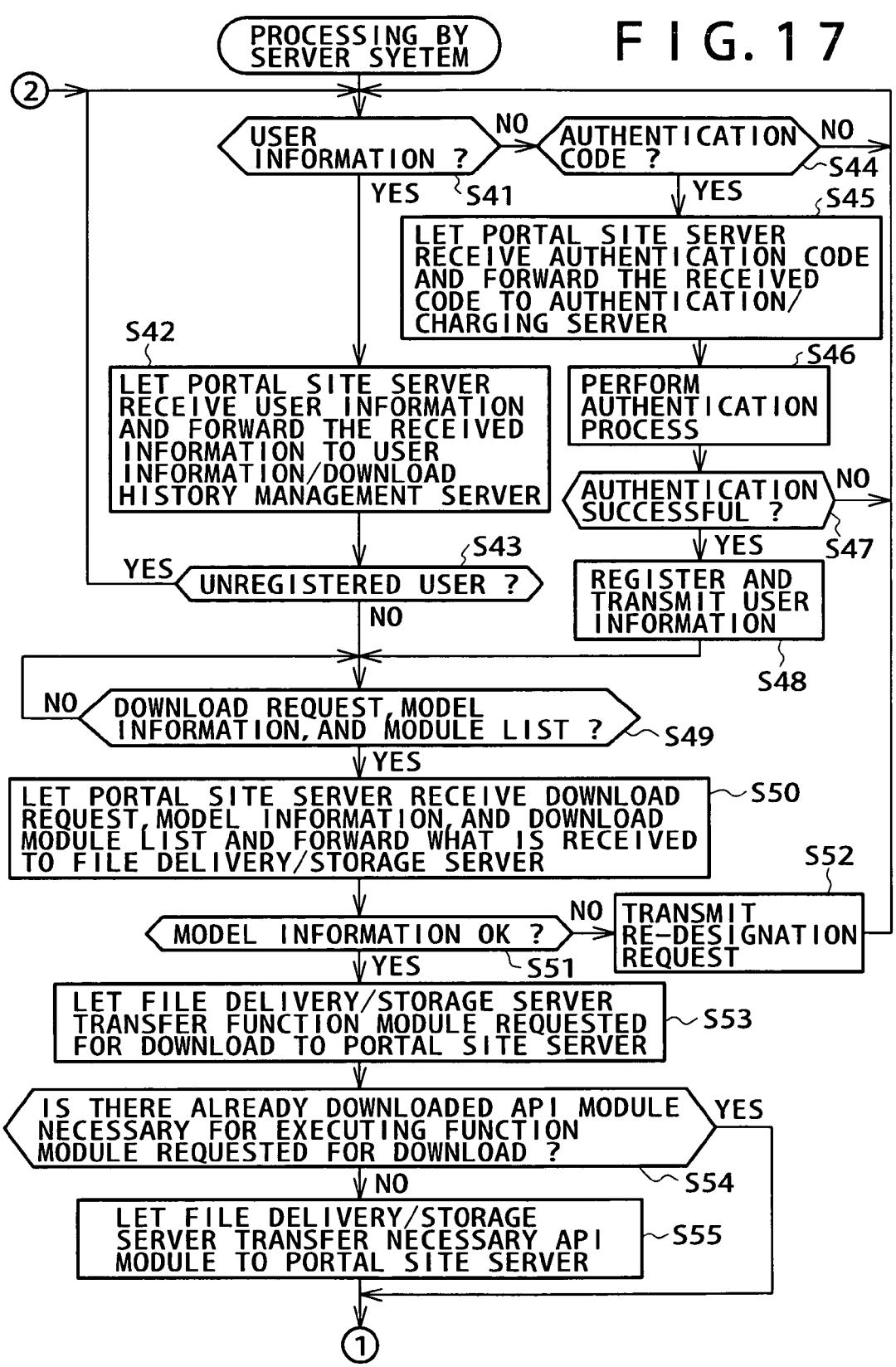
FIG. 17 is a flowchart of steps constituting a process performed by the server system 21.
Figure 18:
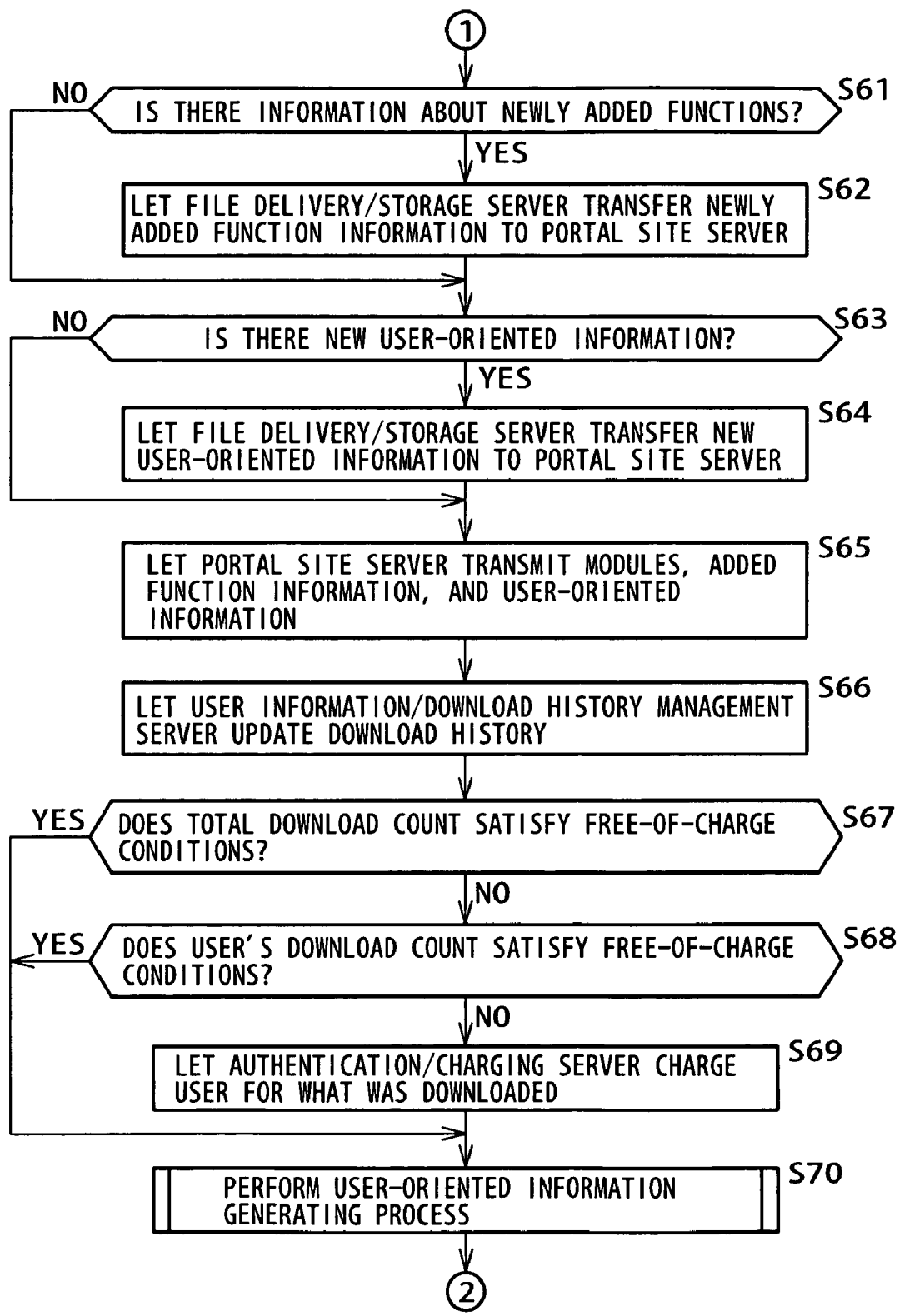
FIG. 18 is a flowchart of steps constituting another process performed by the server system 21.

Described below with reference to the flowcharts of FIGS. 17 and 18 are processes carried out by the server system 21 shown in FIG. 9.

When the TV set 23 accesses the portal site server 61 of the server system 21 as described with reference to FIG. 16, the portal site server 61 checks in step S41 of FIG. 17 to determine whether user-information is transmitted from the TV set 23. If in step S41 the user-information is found to be sent from the TV set 23, step S42 is reached. In step S42, the portal site server 61 receives the user-information and forwards the received information to the user-information/download history management server 64. Step S42 is followed by step S43.

In step S43, based on the user-information sent from the portal site server 61, the user-information/download history management server 64 determines whether the user whose TV set 23 has accessed the portal site server 61 (i.e., accessing user) has already registered.

If in step S43 the accessing user is not found to have registered, i.e., if the user-information forwarded from the portal site server 61 is not found registered in the user-information/download history management server 64 (more specifically on the hard disc drive 75), that means the accessing user is an illegitimate user. In that case, the process regarding that user is aborted, and step S41 is reached again.

If in step S43 the accessing user is found to have registered already, i.e., if the user information about the accessing user sent from the portal site server 61 is found to have registered with the user information/download history management server 64, step S49 is reached. Then the process about the accessing server is continued.

If in step S41 no user-information is found to have come from the TV set 23, step S44 is reached. In step S44, the portal site server 61 determines whether the user authentication code is transmitted from the TV set 23. If in step S44 the user authentication code is not found to have been sent, step S41 is reached again and the subsequent steps are repeated.

If in step S44 the user authentication code is found to be transmitted from the TV set 23, then step S45 is reached. In step S45, the portal site server 61 receives the user authentication code, forwards the received code to the authentication/charging server 63, and goes to step S46.

In step S46, the authentication/charging server 63 carries out an authentication process using the accessing user's user authentication code sent from the portal site server 61, and transmits the result of the authentication to the portal site server 61. Step S46 is followed by step S47.

In step S47, the portal site server 61 receives the result of the authentication from the authentication/charging server 63 and forwards what is received to the accessing user's TV set 23 while referencing the result concurrently to determine whether the authentication has succeeded. If in step S47 the authentication is found to have failed, the process regarding the accessing user is aborted and step S41 is reached again.

If in step S47 the authentication is found to be successful, step S48 is reached. In step S48, the portal site server 61 requests the user information/download history management server 64 to issue and register user information about the accessing user. The issued user information is transmitted to the accessing user's TV set 23, and step S49 is reached.

In step S48, the user information/download history management server 64 generates a unique ID and a password, and registers user information including that ID and password onto the hard disc drive 75 (FIG. 10) while sending the same information to the portal site server 61 at the same time. The portal site server 61 transmits to the accessing user's TV set 23 the user information sent from the user information/download history management server 64.

Upon user information registration, the portal site server 61 requests the accessing user's TV set 23 to furnish the user's credit card number or bank account number by which the download of programs (modules) is paid for. The user information/download history management server 64 registers the credit card number or bank account number in correspondence with the applicable user information.

In step S49, the portal site server 61 determines whether the download request, model information, and module list are transmitted from the accessing user's TV set 23. These pieces of information are supposed to have been sent in step S28 of FIG. 16. If the download request, model information, and module list are not found to be transmitted yet, step S49 is repeated.

If in step S49 the download request, model information, and module list are found to be sent from the accessing user's TV set 23, step S50 is reached. In step S50, the portal site server 61 receives the download request, model information, and module list and forwards them to the file delivery/storage server 62. Step 50 is followed by step S51.

In step S51, the file delivery/storage server 62 recognizes the TV set version necessary for executing the module requested by the download request (the version is called the necessary version where appropriate), and determines whether the accessing user's TV set 23 has a version equal to or higher than the necessary version on the basis of the model information about the TV set 23.

If in step S51 the version of the accessing user's TV set 23 is found to be lower than the necessary version, i.e., if the TV set 23 is found incapable of executing the module requested by the download request, then step S52 is reached. In step S52, the portal site server 61 transmits to the accessing user's TV set 23 the re-designation request described above with reference to FIG. 16. The subsequent process regarding the accessing user is then aborted, and step S41 is reached again.

If in step S51 the accessing user's TV set 23 is found to have a version equal to or higher than the necessary version, i.e., if the TV set 23 is found capable of executing the module requested by the download request, then step S53 is reached. In step S53, the file delivery/storage server 62 reads the module of the function object requested by the download request from the hard disc drive 75 (FIG. 10), transfers the retrieved module to the portal site server 61, and goes to step S54.

In step S54, the file delivery/storage server 62 references the accessing user's module list in order to determine whether an API module necessary for executing the function object module requested by the download request has already been downloaded by the accessing user's TV set 23 (the API module is called the necessary API module where appropriate).

If in step S54 the necessary API module is found already downloaded by the accessing user's TV set 23, i.e., if the necessary API module is found registered in the accessing user's module list, then step S55 is skipped, and step S61 of FIG. 18 is reached.

If in step S54 the necessary API module is not found downloaded by he accessing user's TV set 23, i.e., if the necessary API module is not found registered in the accessing user's module list, then step S55 is reached. In step S55, the file delivery/storage server 62 reads the necessary API module from the hard disc drive 75 (FIG. 10), transmits the retrieved module to the portal site server 61, and goes to step S61 of FIG. 18.

In step S61 of FIG. 18, the file delivery/storage server 62 determines whether any added function information is registered anew on the hard disc drive 75 (FIG. 10).

When the manufacturer or like entity has developed a module that provides an additional new function, the newly developed module and added function information about the new function are registered in the file delivery/storage server 62 (more specifically on the hard disc drive 75). In step S61, a check is made to see whether such added function information has been registered anew in the file delivery/storage server 62.

If in step S61 no added function information is found to be registered in the file delivery/storage server 62, then step S62 is skipped and step S63 is reached.

If in step S61 added function information is found registered anew in the file delivery/storage server 62, step S62 is reached. In step S62, the file delivery/storage server 62 transmits the newly added function information to the portal site server 61 before going to step S63.

In step S63, the user information/download history management server 64 determines whether any new user-oriented information for the accessing user is registered in the file delivery/storage server 62 (more specifically on the hard disc drive 75).

The user information/download history management server 64 generates user-oriented information destined for the accessing user, in a user-oriented information generating process of step S70, to be described later. The generated information is registered in the file delivery/storage server 62. What takes place in step S63 is thus a check on whether any new user-oriented information for the accessing user is being held by the file delivery/storage server 62.

If in step S63 no user-oriented information for the accessing user is found registered anew in the file delivery/storage server 62, step S64 is skipped, and step S65 is reached.

If in step S63 any new user-oriented information for the accessing user is found registered in the file delivery/storage server 62, then step S64 is reached. In step S64, the file delivery/storage server 64 transmits the user-oriented information in question to the portal site server 61. Step S64 is followed by step S65.

In step S65, the portal site server 61 transmits to the accessing user's TV set 23 the function object module that was sent from the file delivery/storage server 62 in step S53 of FIG. 17.

If in step S55 of FIG. 17 the API module was sent from the file delivery/storage server 62 to the portal site server 61, that API module is also transmitted to the accessing user's TV set 23 in step S65. If any added function information was sent from the file delivery/storage server 62 to the portal site server 61 in step S62, that added function information is also transmitted to the accessing user's TV set 23 in step S65. If any user-oriented information was sent from the file delivery/ storage server 62 to the portal site server 61 in step S64, that user-oriented information is also transmitted to the accessing user's TV set 23 in step S65.

Thereafter, step S66 is reached in which the user information/download history management server 64 updates the accessing user's download history. That is, when the accessing user registers his or her user information, the user information/download history management server 64 associates the registered user information with a blank download history. In step S66, the user information/download history management server 64 recognizes the function object that the portal site server 61 allowed the accessing user's TV set 23 to download in step S65, and updates the download history corresponding to the accessing user's user information by supplementing the history with information representing the recognized function object (called the downloaded function object where appropriate).

After the download history update performed in step S66, step S67 is reached. In step S67, the authentication/charging server 63 references the download histories in the user information/download history management server 64 in order to determine whether the total number of downloaded function objects satisfies conditions under which downloaded function objects are offered free of charge.

More specifically, the authentication/charging server 63 in step S67 refers to all users' download histories in the user information/download history management server 64 so as to recognize the total number of downloaded function objects. The authentication/charging server 63 then checks to see if the total download count satisfies the free-of-charge conditions.

It might happen that the manufacturer develops and distributes a new function object in the so-called beta version. In that case, the users who download the new function object immediately after its development supposedly act as monitors. Since some of these users are asked to feed back their findings about the new function to the manufacturer, it is deemed appropriate to provide them with the function object free of charge as long as their numbers are limited. Illustratively, the free-of-charge conditions in step S67 may require that the total download count be lower than a predetermined number.

If in step S67 the total number of downloaded function objects is found to meet the free-of-charge conditions, steps S68 and S69 are skipped, and step S70 is reached. In this case, a charging process to be performed in step S69, which will be discussed later, will not take place.

If in step S67 the total number of downloaded function objects is not found to satisfy the free-of-charge conditions, then step S68 is reached. In step S68, the authentication/charging server 63 references the accessing user's download history in the user information/download history management server 64 in order to recognize the number of function objects downloaded by the user so far. The authentication/charging server 63 then checks to see if the accessing user's download count satisfies the conditions under which the downloaded function objects are offered free of charge.

There might be a service proposed to let the user who has paid for numerous downloaded function objects download one or a plurality of function objects free of charge. In such a case, the free-of-charge conditions in step S68 may require that the accessing user's download count be equal to or greater than a predetermined number.

If in step S68 the accessing user's download count is found to satisfy the free-of-charge conditions, then step S69 is skipped and step S70 is reached. In this case, the charging process, to be performed in step S69 discussed later, will not take place.

If in step S68 the accessing user's download count is not found to meet the free-of-charge conditions, step S69 is reached. In step S69, the authentication/charging server 63 carries out the charging process on the downloaded functional object before reaching step S70.

That is, the authentication/charging server 63 retains, illustratively as part of the accessing user's user information, fees for the function objects downloaded so far by the user. In step S69, the authentication/charging server 63 adds a fee for the additionally downloaded function object to the accessing user's user information, thereby updating the retained fees to be paid for by the accessing user. The fees associated with each user's user information are paid illustratively from the user's bank account at a predetermined date (e.g., end of month). The users' bank accounts and other information necessary for paying the fees are registered at the time of user registration as mentioned above.

In step S70, the user information/download history management server 64 generates user-oriented information for the accessing user during the user-oriented information generating process based on the user's download history. The user-oriented information thus generated is registered in the file delivery/storage server 62. This terminates the processing with regard to the accessing user. After step S70, step S41 of FIG. 17 is reached again.

The user-oriented information generating process in step S70 of FIG. 18 will now be described with reference to the flowchart of FIG. 19.

In step S81, the user information/download history management server 64 references the download histories so as to acquire on a category-by-category basis the number of function objects downloaded by the accessing user. Function objects are each furnished with a category identifier identifying the category to which the function object in question belongs, as described earlier. The download histories contain information including the category identifiers identifying the function objects downloaded so far by each accessing user. In step S81, the user information/download history management server 64 obtains by category the number of function objects downloaded so far by the current accessing user, on the basis of the category identifiers included in the accessing user's download history.

In step S82, the user information/download history management server 64 recognizes the category of function objects downloaded with high frequency by the accessing user (the category is called the frequently-downloaded category where appropriate), on the basis of the category-wise numbers of the function objects downloaded so far by the user. Step S82 is followed by step S83.

In step S83, the user information/download history management server 64 determines whether the file delivery/storage server 62 contains any new information regarding the frequently-downloaded category.

That is, the file delivery/storage server 62 has different categories of information registered by the manufacturer of the TV set 23 or by other entities with a view to offering such information to users. What takes place in step S83 is thus a check on whether the information thus registered contains any information belonging to the frequently-downloaded category.

If in step S83 the file delivery/storage server 662 is not found to have any new information belonging to the frequently-downloaded category, step S84 is skipped, and control is returned.

If in step S83 the file delivery/storage server 62 is found to have new information belonging to the frequently-downloaded category, step S84 is reached. In step S84, the user information/download history management server 64 associates the accessing user's user information with the new information belonging to the frequently-downloaded category so as to prepare user-oriented information for the user in question. Control is then returned.

The user-oriented information may illustratively include advertisements about free-of-charge programs and information about newly available functions for the category of CS digital broadcasts.

FIG. 20 outlines a business model supported by the inventive communication system described above.

In this model, the manufacturer develops function objects and registers user-oriented information in the server system 21. The user of the TV set 23 requests the server system 21 to let his or her TV set 23 download function objects for implementing the functions desired by the user. The server system 21 offers the requested function objects to the user. The user pays the manufacturer for the downloaded function objects via the server system 21. The server system 21 generates download histories of function objects downloaded by users. The manufacturer acquires the download histories thus generated from the server system 21.

As described, the TV set 23 downloads from the server system 21 the modules (i.e., software) for implementing the functions requested by the user. Illustratively, the user may optionally add necessary software functions to his or her next-generation receiver such as the TV set 23 with capabilities for receiving terrestrial analog broadcasts, terrestrial digital broadcasts, BS/CS digital broadcasts; for browsing over the Internet; and for playing video games. Furthermore, the user may customize these software functions of the receiver as needed.

The user may pay the manufacturer only for the software functions specifically needed on his or her TV set 23; the user need not pay for any unnecessary functions.

For example, if a TV set 23 currently has no capability for receiving CS digital broadcasts and if the user of that TV set 23 wants that capability, that user will be offered the receiving function for a fee.

The server system 21 generates download histories that may be referred to by the manufacturer. The reference allows the manufacturer instantly to know which of the software functions are being utilized with high frequency by users. The users' preferences thus discerned enable the manufacturer to decide on which functions to expand and which functions to discard. The users' needs will be reflected in the next products to be developed (including software).

The manufacturer can offer various services based on the user's download count. For example, upon purchase of more than a certain number of software functions, the user may be offered one more function free of charge. Depending on the total number of functions purchased (i.e., downloaded), the user may be offered correspondingly added functions free of charge.

The manufacturer may provide each user with diverse kinds of user-oriented information about the functions that may attract the user's interest. Such user-oriented information (e.g., outlines of new functions meeting the user's preferences along with descriptions of services attached to these functions) is specifically targeted for and distributed to each user.

On the menu screen, the TV set 23 displays executable buttons in one format and optional buttons in a different format. A mere glance at the menu screen allows the user instantly to recognize which functions are currently executable and which functions are optionally available. The executable functions may each be executed by simply operating the corresponding button on the menu screen. Any of the optional functions can be obtained by operating the relevant download button to download the module necessary for implementing the function in question. Details of each of the optional functions can be known by focusing on the corresponding optional button.

It was shown above that upon download of a module from the server system 21 to the TV set 23, the server system 21 delivers added function information and user-oriented information concurrently to the TV set 23. Alternatively, added function information and user-oriented information may be delivered to the TV set periodically. The user will then be able to acquire these kinds of information on a periodical basis with or without the download of modules.

With the above-described embodiment, user-oriented information is displayed while none of the buttons is being focused on the menu screen. Alternatively, user-oriented information may be displayed in a differently timed manner. For example, user-oriented information may be displayed immediately after it has been delivered. In another example, user-oriented information may be displayed periodically.

Figure 19:
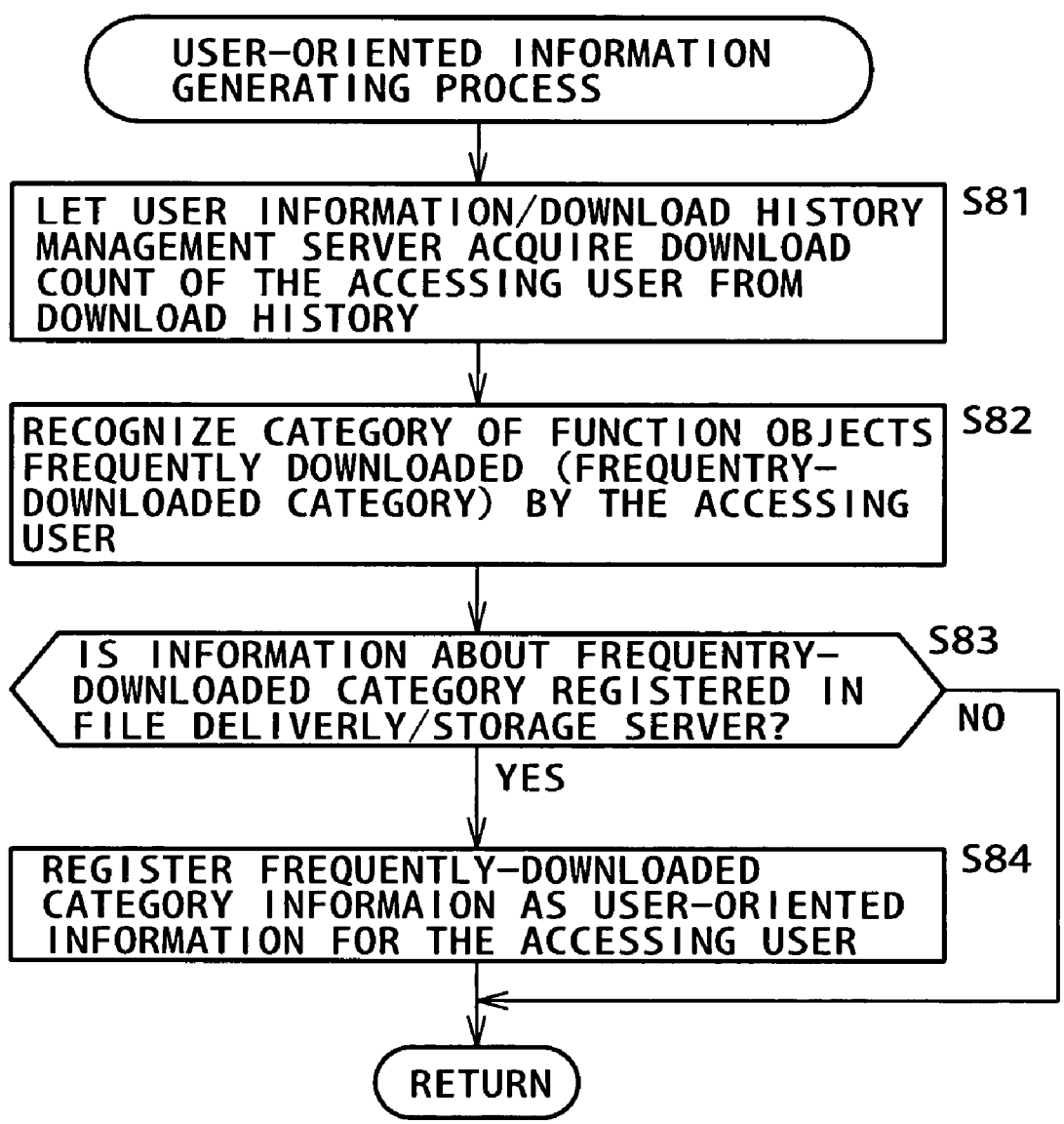
FIG. 19 is a flowchart of steps constituting a user-oriented information generating process.

During the user-oriented information generating process of FIG. 19, user-oriented information is generated only for the accessing user. Alternatively, user-oriented information may be generated for all users that have registered with the system.

In the foregoing description, this invention was shown applied to the TV set that receives TV broadcast signals. However, this is not limitative of the invention. The invention may also be applied to any other display device capable of display menu screens such as those shown in FIGS. 12 through 15.

INDUSTRIAL APPLICABILITY

As described, the communication system according to the invention can offer services to users in response to their needs and preferences.

The invention claimed is:

1. A communication system, comprising:
   a data processing apparatus configured to receive and process data; and
   a data providing apparatus configured to provide data to said data processing apparatus, wherein said data processing apparatus includes
      means for displaying a first button representing an executable function in a first display format and a second button representing an optional function in a second display format together in a list, and for displaying, with the list, a download button requesting to download software for executing the function represented by the second button in response to selecting the second button,
      means for executing a function associated with the first button in response to an actuation of the first button,
      means for downloading said software provided by said data processing apparatus when said download button is actuated, and
      means for updating the display of the list by displaying the second button in said first display format in response to said software being downloaded, and
   wherein said data providing apparatus includes
      means for receiving said download request for said software from said data processing apparatus, and
      means for transmitting said software to said data processing apparatus in response to said download request for said software.

2. The communication system according to claim 1, wherein said data providing apparatus further comprises means for creating a download history regarding said software downloaded by said data processing apparatus.

3. The communication system according to claim 2, wherein said data providing apparatus further comprises means for charging for the downloaded software in keeping with said download history regarding said software transmitted to said data processing apparatus.

4. The communication system according to claim 2, wherein said data providing apparatus further comprises:
   means for recognizing a category of the software downloaded by said data processing apparatus with a high frequency based on said download history; and
   means for transmitting user-oriented information belonging to said category recognized by said category recognizing means, wherein said data processing apparatus includes means for displaying said user-oriented information.

5. A data processing apparatus for receiving and processing data from a data providing apparatus, said data processing apparatus comprising:

means for displaying a first button representing an executable function in a first display format and a second button representing an optional function in a second display format together in a list, and for displaying, with the list, a download button to request downloading software for executing the function represented by the second button in response to selecting the second button;

means for executing a function associated with the first button in response to an actuation of the first button;

means for downloading said software from said data providing apparatus in response to actuating said download button; and means for updating the display of the list by displaying the second button in said first display format in response to said software being downloaded.

6. The data processing apparatus according to claim 5, further comprising:

means for receiving, from said data providing apparatus, information of a new function based on said data providing apparatus determining the new function exists, wherein, said means for displaying displays a new button representing said new function when software exists for executing the new function and information about the new function is received from the data providing apparatus, and said means for updating updates the list by displaying the new button in said first display format in response to downloading the software for executing the new function.

7. The data processing apparatus according to claim 5, further comprising:

means for displaying user-oriented information when said data providing apparatus recognizes a category of software downloaded by said data processing apparatus with high frequency based on a download history regarding the downloaded software and when said data providing apparatus transmits said user-oriented information belonging to said category.

8. A data processing method for receiving and processing data from a data providing apparatus, said data processing method comprising:

displaying a first button representing an executable function in a first display format and a second button representing an optional function in a second display format together in a list;

displaying a download button to request downloading software for executing the function represented by the second button in response to selecting the second button;

executing a function associated with the first button in response to an actuation of the first button;

downloading said software provided by said data providing apparatus in response to actuating said download button; and updating the display of the list by displaying the second button in said first display format in response to said software being downloaded.

9. A non-transitory computer readable storage medium encoded with a computer readable program configured to cause an information processing apparatus to execute a method, the method comprising displaying a first button representing an executable function in a first display format and a second button representing an optional function in a second display format together in a list;

displaying a download button to request downloading software for executing the function represented by the second button in response to selecting the second button;

executing a function associated with the first button in response to an actuation of the first button;

downloading said software provided by said data providing apparatus in response to actuating said download button; and updating the display of the list by displaying the second button in said first display format in response to said software being downloaded.

10. A data providing apparatus for providing data to a data processing apparatus which receives and processes said data, said data providing apparatus comprising:

means for receiving a download request for executable software from said data processing apparatus;

means for transmitting said software to said data processing apparatus in response to said download request for said software;

means for creating a download history regarding said software downloaded by said data processing apparatus;

means for performing a relevant process in keeping with said download history, including means for recognizing a category of software downloaded by said data processing apparatus with high frequency based on said download history; and means for transmitting information of a new function which is not performed by said data processing apparatus to said data processing apparatus when new software exists for executing the new function.

11. A data providing apparatus according to claim 10, wherein said means for performing further comprises means for charging for the downloaded software in keeping with said download history regarding said software transmitted to said data processing apparatus.

12. A data providing apparatus according to claim 10, wherein said means for performing further comprises:

means for transmitting user-oriented information belonging to said category recognized by said category recognizing means.

13. A data providing method for providing data to a data processing apparatus which receives and processes said data, said data providing method comprising:

receiving a download request for executable software from said data processing apparatus;

transmitting said software to said data processing apparatus in response to said download request for said software;

creating a download history regarding said software downloaded by said data processing apparatus;

performing a relevant process in keeping with said download history;

transmitting information of a new function which is not performed by said data processing apparatus to said data processing apparatus when new software exists for executing the new function; and recognizing a category of software downloaded by said data processing apparatus with high frequency based on said download history.

14. A non-transitory computer readable storage medium encoded with a computer readable program configured to cause an information processing apparatus to execute a method, the method comprising receiving a download request for executable software from said data processing apparatus;

transmitting said software to said data processing apparatus in response to said download request for said software;

creating a download history regarding said software downloaded by said data processing apparatus;

performing a relevant process in keeping with said download history;

transmitting information of a new function which is not performed by said data processing apparatus to said data processing apparatus when new software exists for executing the new function; and recognizing a category of software downloaded by said data processing apparatus with high frequency based on said download history.

15. A communication system, comprising:

a data processing apparatus configured to receive and process data; and a data providing apparatus configured to provide data to said data processing apparatus, wherein said data processing apparatus includes a button display controlling unit configured to display a first button representing an executable function in a first display format and a second button representing an optional function in a second display format together in a list, and to display, with the list, a download button for requesting to download software for executing the function represented by the second button in response to selecting the second button, an executing unit configured to execute a function associated with the first button in response to an actuation of the first button, a downloading unit configured to download said software provided by said data processing apparatus in response to actuating said download button, a display updating unit configured to update the display of the list by displaying the second button in said first display format in response to said software being downloaded, and wherein said data providing apparatus includes a software request receiving unit configured to receive said download request for said software from said data processing apparatus, and a software transmitting unit configured to transmit said software to said data processing apparatus in response to said download request for said software.

16. The communication system according to claim 15, wherein said data providing apparatus further comprises a download history creating unit configured to create a download history regarding said software downloaded by said data processing apparatus.

17. The communication system according to claim 16, wherein said data providing apparatus further comprises a charging unit configured to charge for the downloaded software in keeping with said download history regarding said software transmitted to said data processing apparatus.

18. The communication system according to claim 16, wherein said data providing apparatus further comprises:

a category recognizing unit configured to recognize a category of the software downloaded by said data processing apparatus with a high frequency based on said download history; and a user-oriented information transmitting unit configured to transmit user-oriented information belonging to said category recognized by said category recognizing unit, wherein said data processing apparatus includes a user-oriented information display controlling unit configured to display said user-oriented information.

19. A data processing apparatus for receiving and processing data from a data providing apparatus, said data processing apparatus comprising:

a button display controlling unit configured to display a first button representing an executable function in a first display format and a second button representing an optional function in a second display format together in a list, and to display with the list, a download button to request downloading software for executing the function represented by the second button in response to selecting the second button;

a executing unit configured to execute a function associated with the first button in response to an actuation of the first button;

a downloading unit configured to download said software from said data providing apparatus in response to actuating said download button; and a display updating unit configured to update the display of the list by displaying the second button in said first display format in response to said software being downloaded.

20. The data processing apparatus according to claim 19, wherein said data processing apparatus further comprises a user-oriented information display controlling unit configured to display user-oriented information when said data providing apparatus recognizes a category of software downloaded by said data processing apparatus with high frequency based on a download history regarding the downloaded software and when said data providing apparatus transmits user-oriented information belonging to said category.

21. The data processing apparatus according to claim 19, further comprising:

a receiving unit configured to receive, from said data providing apparatus, information of a new function based on said data providing apparatus determining the new function exists, wherein said button display controlling unit is configured to display a new button representing said new function when software exists for executing the new function and information about the new function is received from the data providing apparatus, and said display updating unit is configured to update the list by displaying the new button in said first display format in response to downloading the software for executing the new function.

22. The communication system according to claim 1, wherein:

said means for transmitting of said data providing apparatus transmits information of a new function to said data processing apparatus in response to determining the new function exists, said means for displaying of said data processing apparatus displays a new button in said second format in the list representing the new function corresponding to the information of the new function, and said means for updating updates the list by displaying the new button in said first display format in response to new software corresponding to the new function being downloaded.

* * * * *